(12) United States Patent
Hao et al.

(10) Patent No.: US 11,418,302 B2
(45) Date of Patent: Aug. 16, 2022

(54) COLLISION HANDLING MECHANISMS FOR DYNAMIC TDD SYSTEMS

(71) Applicant: Qualcomm Incorporated, San Diego, CA (US)

(72) Inventors: Chenxi Hao, Beijing (CN); Yu Zhang, Beijing (CN); Liangming Wu, Beijing (CN); Chao Wei, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/608,328

(22) PCT Filed: Jun. 8, 2018

(86) PCT No.: PCT/CN2018/090512
§ 371 (c)(1),
(2) Date: Oct. 25, 2019

(87) PCT Pub. No.: WO2018/224041
PCT Pub. Date: Dec. 13, 2018

(65) Prior Publication Data
US 2020/0169364 A1 May 28, 2020

(30) Foreign Application Priority Data
Jun. 8, 2017 (WO) ................ PCT/CN2017/087627

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0626* (2013.01); *H04L 5/0094* (2013.01);
(Continued)

(58) Field of Classification Search
CPC ..... H04B 7/0626; H04L 5/0005; H04L 5/001; H04L 5/0044; H04L 5/0048; H04L 5/005;
(Continued)

(56) References Cited

U.S. PATENT DOCUMENTS 9,698,966 B2    7/2017  Ji et al.
9,801,192 B2 *  10/2017 Kim ..................... H04L 27/261
(Continued)

FOREIGN PATENT DOCUMENTS

CN    104303557 A    1/2015
CN    104981994 A    10/2015
(Continued)

OTHER PUBLICATIONS

Agiwal et al., "Method and Apparatus for Handling Collisions in Next Generation Communication System", Jul. 29, 2016, Samsung Electronics Co., Ltd., U.S. Appl. No. 62/368,369, filed Jul. 29, 2016, Total pp. 11 (Year: 2016).*

(Continued)

*Primary Examiner* — Shah M Rahman
(74) *Attorney, Agent, or Firm* — Qualcomm Incorporated

(57) ABSTRACT

Methods, systems, and devices for wireless communication are described. Generally, the described techniques provide for communicating an uplink grant and a channel state information reference signal (CSI-RS) trigger. A wireless device may identify a pending collision for a slot of a carrier between a CSI-RS and uplink data. The wireless device may determine a communication configuration for the CSI-RS and the uplink data such that no collision occurs. The determined communication configuration for the CSI-RS may include delaying one of the colliding signals, transmitting only one of the colliding signals and suppressing the other, or reconfiguring the slot such that both signals can be transmitted successfully. Additionally, the UE and the base (Continued)

station may determine a CSI reporting configuration based on the determined communication configuration.

10 Claims, 14 Drawing Sheets

(51) Int. Cl.
*H04L 5/14* (2006.01)
*H04W 24/10* (2009.01)
*H04W 72/04* (2009.01)
*H04W 72/14* (2009.01)

(52) U.S. Cl.
CPC ............... *H04L 5/14* (2013.01); *H04W 24/10* (2013.01); *H04W 72/042* (2013.01); *H04W 72/14* (2013.01)

(58) Field of Classification Search
CPC ... H04L 5/0053; H04L 5/0055; H04L 5/0057; H04L 5/0091; H04L 5/0094; H04L 5/14; H04L 5/1469; H04W 24/10; H04W 72/042; H04W 72/14
See application file for complete search history.

(56) References Cited

U.S. PATENT DOCUMENTS

| | | | |
|---|---|---|---|
| 2011/0019637 A1* | 1/2011 | Ojala | H04L 1/0026 370/329 |
| 2012/0033643 A1* | 2/2012 | Noh | H04L 5/0048 370/335 |
| 2012/0201154 A1 | 8/2012 | Chandrasekhar et al. | |
| 2013/0170376 A1* | 7/2013 | Dinan | H04L 1/0026 370/252 |
| 2013/0301448 A1* | 11/2013 | Sayana | H04B 7/024 370/252 |
| 2014/0010126 A1* | 1/2014 | Sayana | H04L 5/0035 370/336 |
| 2014/0092827 A1* | 4/2014 | Jongren | H04L 25/0222 370/329 |
| 2015/0029903 A1 | 1/2015 | Chen et al. | |
| 2015/0124663 A1* | 5/2015 | Chen | H04L 1/0023 370/278 |
| 2015/0365152 A1* | 12/2015 | Frenne | H04L 5/005 370/252 |
| 2016/0014662 A1* | 1/2016 | Yiu | H04B 7/0639 455/436 |
| 2016/0065350 A1* | 3/2016 | Suzuki | H04W 28/18 370/329 |
| 2016/0112892 A1 | 4/2016 | Damnjanovic et al. | |
| 2016/0134408 A1* | 5/2016 | Kim | H04L 5/0048 370/329 |
| 2016/0197715 A1 | 7/2016 | Papasakellariou et al. | |
| 2016/0330011 A1* | 11/2016 | Lee | H04L 5/0066 |
| 2016/0337105 A1 | 11/2016 | Lawton et al. | |
| 2016/0366684 A1* | 12/2016 | Kim | H04W 52/146 |
| 2017/0086175 A1* | 3/2017 | Yasukawa | H04W 72/0453 |
| 2017/0250781 A1* | 8/2017 | Golitschek Edler Von Elbwart | H04L 5/0094 |
| 2017/0303144 A1 | 10/2017 | Guo et al. | |
| 2017/0359746 A1* | 12/2017 | Lee | H04L 5/0044 |
| 2018/0035332 A1 | 2/2018 | Agiwal et al. | |
| 2018/0192414 A1* | 7/2018 | Takahashi | H04W 24/10 |
| 2018/0192415 A1* | 7/2018 | Takahashi | H04L 5/0053 |
| 2018/0279144 A1* | 9/2018 | Mukherjee | H04W 24/08 |
| 2018/0332478 A1* | 11/2018 | Noh | H04L 5/0051 |
| 2019/0116594 A1* | 4/2019 | Kwak | H04L 5/0044 |
| 2019/0215119 A1* | 7/2019 | Kim | H04L 1/0027 |
| 2020/0067583 A1* | 2/2020 | Shin | H04B 7/0486 |
| 2020/0322113 A1* | 10/2020 | Gao | H04L 5/0057 |

FOREIGN PATENT DOCUMENTS

| | | |
|---|---|---|
| CN | 105706484 A | 6/2016 |
| CN | 107135025 A | 9/2017 |
| EP | 2983403 A1 | 2/2016 |
| WO | WO 2016079905 A1 | 5/2016 |
| WO | WO 2017039414 A1 | 3/2017 |

OTHER PUBLICATIONS

International Search Report and Written Opinion—PCT/CN2018/090512—ISA/EPO—dated Aug. 29, 2018.
International Search Report and Written Opinion—PCT/CN2017/087627—ISA/EPO—dated Feb. 24, 2018.
Supplementary European Search Report—EP18813704—Search Authority—Munich—dated Feb. 22, 2021.
ZTE, et al., "Discussion on Measurement Related Reference Signals", 3GPP Draft, 3GPP TSG RAN WG1 Meeting #87, R1-1611412, Discussion on Measurement Related Reference Signals, 3rd Generation Partnership Project (3GPP), Mobile Competence Centre, 650, Route Des Lucioles, F-06921, Sophia-Antipolis Cedex, France, vol. RAN WG1, No. Reno, USA; Nov. 14, 2016-Nov. 18, 2016, Nov. 13, 2016 (Nov. 13, 2016), XP051175392, 8 pages, Retrieved from the Internet: URL: http://www.3gpp.org/ftp/Meetings_3GPP_SYNC/RAN1/Docs/ [retrieved on Nov. 13, 2016], p. 6, figure 3.

* cited by examiner

COLLISION HANDLING MECHANISMS FOR DYNAMIC TDD SYSTEMS

CROSS REFERENCES

The present application is a 371 national phase filing of International Patent Application No. PCT/CN2018/090512 by Hao et al., entitled "COLLISION HANDLING MECHANISMS FOR DYNAMIC TDD SYSTEMS," filed Jun. 8, 2018; and to International Patent Application No. PCT/CN2017/087627 by Hao et al., "COLLISION HANDLING MECHANISMS FOR DYNAMIC TDD SYSTEMS," filed Jun. 8, 2017, each of which is assigned to the assignee hereof, which is hereby incorporated by reference in their entirety.

BACKGROUND

The following relates generally to wireless communication, and more specifically to collision handling mechanisms for dynamic time division duplexed (TDD) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some examples, a base station may communicate with a UE in a wireless communications system. The base station may transmit to the UE a CSI-RS trigger, which may indicate to the UE that the base station will transmit CSI-RS. Additionally, the base station may transmit an uplink grant, which may indicate resources for the UE to transmit uplink data. The downlink CSI-RS transmission and uplink data transmission may be associated with independent time delays between the trigger or grant and the transmission. In some examples, the time delays corresponding to the CSI-RS transmission and the uplink data transmission may be configured such that the CSI-RS and the uplink data transmission collide within a single slot.

SUMMARY

The described techniques relate to improved methods, systems, devices, or apparatuses that support collision handling mechanisms for dynamic time division duplexed (TDD) systems. Generally, the described techniques provide for receiving, at a user equipment (UE), an uplink grant and a channel state information reference signal (CSI-RS) trigger. Based on the received downlink signals, the UE and the base station may identify a pending collision for a slot of a carrier (e.g., a TDD carrier) between a CSI-RS corresponding to the CSI-RS trigger, and uplink data corresponding to the uplink grant. The UE and the base station may determine a communication configuration for the CSI-RS and the uplink data such that no collision occurs. The determined communication configuration for the CSI-RS may include delaying one of the colliding signals, transmitting only one of the colliding signals and suppressing the other, or reconfiguring the slot such that both signals can be transmitted successfully. Additionally, the UE and the base station may determine a CSI reporting configuration based on the determined communication configuration.

A method of wireless communication at a UE is described. The method may include receiving a CSI-RS trigger and an uplink grant, identifying, for a slot of a carrier, a pending collision between a CSI-RS corresponding to the CSI-RS trigger and uplink data corresponding to the uplink grant, determining a communication configuration for the CSI-RS and the uplink data based on the pending collision, identifying a CSI report trigger, and determining a CSI reporting configuration based on the communication configuration and the CSI report trigger.

An apparatus for wireless communication at a UE is described. The apparatus may include a processor, memory in electronic communication with the processor, and instructions stored in the memory. The instructions may be executable by the processor to cause the apparatus to receive a CSI-RS trigger and an uplink grant, identify, for a slot of a carrier, a pending collision between a CSI-RS corresponding to the CSI-RS trigger and uplink data corresponding to the uplink grant, determine a communication configuration for the CSI-RS and the uplink data based on the pending collision, identify a CSI report trigger, and determine a CSI reporting configuration based on the communication configuration and the CSI report trigger.

Another apparatus for wireless communication at a UE is described. The apparatus may include means for receiving a CSI-RS trigger and an uplink grant, identifying, for a slot of a carrier, a pending collision between a CSI-RS corresponding to the CSI-RS trigger and uplink data corresponding to the uplink grant, determining a communication configuration for the CSI-RS and the uplink data based on the pending collision, identifying a CSI report trigger, and determining a CSI reporting configuration based on the communication configuration and the CSI report trigger.

A non-transitory computer-readable medium storing code for wireless communication at a UE is described. The code may include instructions executable by a processor to receive a CSI-RS trigger and an uplink grant, identify, for a slot of a carrier, a pending collision between a CSI-RS corresponding to the CSI-RS trigger and uplink data corresponding to the uplink grant, determine a communication configuration for the CSI-RS and the uplink data based on the pending collision, identify a CSI report trigger, and determine a CSI reporting configuration based on the communication configuration and the CSI report trigger.

In some examples of the method, apparatuses, and non-transitory computer-readable medium described herein, determining the communication configuration for the CSI-RS and the uplink data further may include operations, features, means, or instructions for suppressing communication of the uplink data in the slot, receiving the CSI-RS in the slot and receiving a signal indicating that the uplink grant was not communicated and requesting a retransmission of the uplink data.

In some examples of the method, apparatuses, and non-transitory computer-readable medium described herein, determining the communication configuration for the CSI-RS and the uplink data further may include operations, features, means, or instructions for determining that a CSI-RS for the slot may have been suspended by a base station and transmitting the uplink data in the slot.

Some examples of the method, apparatuses, and non-transitory computer-readable medium described herein may further include operations, features, means, or instructions for refraining from performing measurements corresponding to the suppressed CSI-RS for the slot on the carrier.

Some examples of the method, apparatuses, and non-transitory computer-readable medium described herein may further include operations, features, means, or instructions for suppressing transmission of a CSI report associated with the suppressed CSI-RS.

Some examples of the method, apparatuses, and non-transitory computer-readable medium described herein may further include operations, features, means, or instructions for transmitting a CSI report associated with the CSI report trigger for the carrier based on measurements of CSI-RS performed prior to the slot.

Some examples of the method, apparatuses, and non-transitory computer-readable medium described herein may further include operations, features, means, or instructions for determining that the carrier may be one of a set of configured component carriers, identifying a CSI-RS received in the slot on at least on second component carrier of the set of configured component carriers, performing measurements on the identified CSI-RS received in the slot on the at least one second component carrier and transmitting a CSI report for the second component carrier based on the measurements for the CSI-RS received in the slot on the at least one second component carrier.

Some examples of the method, apparatuses, and non-transitory computer-readable medium described herein may further include operations, features, means, or instructions for determining a backoff period including one or more slots, receiving the CSI-RS in the slot and transmitting the uplink data in a second slot determined by applying the backoff period from the slot.

Some examples of the method, apparatuses, and non-transitory computer-readable medium described herein may further include operations, features, means, or instructions for determining the backoff period further includes and the method further including.

Some examples of the method, apparatuses, and non-transitory computer-readable medium described herein may further include operations, features, means, or instructions for determining a backoff period including one or more slots, transmitting the uplink data in the slot and receiving the CSI-RS in a second slot determined by applying the backoff period from the slot.

Some examples of the method, apparatuses, and non-transitory computer-readable medium described herein may further include operations, features, means, or instructions for determining an amount of CSI-RS resources, where determining the communication configuration includes, performing rate matching of the uplink data based on the number of uplink symbols and receiving the CSI-RS using the downlink symbols in the slot and transmitting the uplink data using the uplink symbols in the slot.

Some examples of the method, apparatuses, and non-transitory computer-readable medium described herein may further include operations, features, means, or instructions for identifying a downlink control channel received via a first portion of the slot and receiving the CSI-RS, the CSI-RS being multiplexed into the first portion of the slot using one of frequency division multiplexing (FDM), code division multiplexing (CDM), or time-division multiplexing (TDM).

Some examples of the method, apparatuses, and non-transitory computer-readable medium described herein may further include operations, features, means, or instructions for determining that the communication configuration for the CSI-RS corresponds to a delay of the CSI-RS by a first backoff period and performing measurements on the CSI-RS received in a second slot corresponding to the first backoff period from the slot.

Some examples of the method, apparatuses, and non-transitory computer-readable medium described herein may further include operations, features, means, or instructions for determining that a reporting delay from the CSI-RS trigger does not exceed the second slot by at least a threshold number of slots, determining a second backoff period including the first backoff period or a reporting delay and transmitting a CSI report in a third slot corresponding to the second backoff period from the slot in which a CSI report was triggered.

In some examples of the method, apparatuses, and non-transitory computer-readable medium described herein, determining the second backoff period further may include operations, features, means, or instructions for receiving a set of second backoff periods in a first downlink control signal and the method further including.

In some examples of the method, apparatuses, and non-transitory computer-readable medium described herein, at least one of the first downlink control signal and the second downlink control signal include downlink control information (DCI), a media access control (MAC) control element (CE), or a radio resource control (RRC) message.

Some examples of the method, apparatuses, and non-transitory computer-readable medium described herein may further include operations, features, means, or instructions for determining that a reporting delay from the CSI-RS trigger exceeds the second slot by at least a threshold number of slots and transmitting a CSI report in a third slot corresponding to the timing delay indicated in a CSI report trigger.

Some examples of the method, apparatuses, and non-transitory computer-readable medium described herein may further include operations, features, means, or instructions for determining that the carrier may be one of a set of configured component carriers, performing measurements on a CSI-RS received in the slot on at least a second component carrier of the set of component carriers and transmitting a CSI report including the measurements for the CSI-RS received in the slot on the at least the second component carrier.

A method of wireless communication at a base station is described. The method may include transmitting a CSI-RS trigger and an uplink grant, identifying, for a slot of a carrier, a pending collision between a CSI-RS corresponding to the CSI-RS trigger and uplink data corresponding to the uplink grant, determining a communication configuration for the CSI-RS and the uplink data based on the pending collision, identifying a CSI report trigger, and determining a CSI reporting configuration based on the communication configuration and the CSI report trigger.

An apparatus for wireless communication at a base station is described. The apparatus may include a processor, memory in electronic communication with the processor, and instructions stored in the memory. The instructions may be executable by the processor to cause the apparatus to transmit a CSI-RS trigger and an uplink grant, identify, for a slot of a carrier, a pending collision between a CSI-RS corresponding to the CSI-RS trigger and uplink data corresponding to the uplink grant, determine a communication configuration for the CSI-RS and the uplink data based on the pending collision, identify a CSI report trigger, and determine a CSI reporting configuration based on the communication configuration and the CSI report trigger.

Another apparatus for wireless communication at a base station is described. The apparatus may include means for transmitting a channel state information reference signal (CSI-RS) trigger and an uplink grant, identifying, for a slot of a carrier, a pending collision between a CSI-RS corresponding to the CSI-RS trigger and uplink data corresponding to the uplink grant, determining a communication configuration for the CSI-RS and the uplink data based on the pending collision, identifying a CSI report trigger, and determining a CSI reporting configuration based on the communication configuration and the CSI report trigger.

A non-transitory computer-readable medium storing code for wireless communication at a base station is described. The code may include instructions executable by a processor to transmit a CSI-RS trigger and an uplink grant, identify, for a slot of a carrier, a pending collision between a CSI-RS corresponding to the CSI-RS trigger and uplink data corresponding to the uplink grant, determine a communication configuration for the CSI-RS and the uplink data based on the pending collision, identify a CSI report trigger, and determine a CSI reporting configuration based on the communication configuration and the CSI report trigger.

In some examples of the method, apparatuses, and non-transitory computer-readable medium described herein, determining the communication configuration for the CSI-RS and the uplink data further may include operations, features, means, or instructions for transmitting the CSI-RS in the slot and transmitting a signal indicating that the uplink grant was not communicated and requesting a retransmission of the uplink data.

In some examples of the method, apparatuses, and non-transitory computer-readable medium described herein, determining the communication configuration for the CSI-RS and the uplink data further may include operations, features, means, or instructions for determining that a CSI-RS for the slot may have been suspended by a base station and transmitting the uplink data in the slot.

Some examples of the method, apparatuses, and non-transitory computer-readable medium described herein may further include operations, features, means, or instructions for determining a backoff period including one or more slots and transmitting an indication of the backoff period to the UE.

Some examples of the method, apparatuses, and non-transitory computer-readable medium described herein may further include operations, features, means, or instructions for transmitting a set of backoff periods in a first downlink control signal and where transmitting the indication further includes transmitting a second downlink control signal including the indication of the backoff period, where the indication corresponds to one backoff period of the set of backoff periods.

In some examples of the method, apparatuses, and non-transitory computer-readable medium described herein, at least one of the first downlink control signal and the second downlink control signal include a DCI, a MAC-CE, or a RRC message.

Some examples of the method, apparatuses, and non-transitory computer-readable medium described herein may further include operations, features, means, or instructions for determining an amount of CSI-RS resources, where determining the communication configuration includes, performing rate matching of the uplink data based on the number of uplink symbols and transmitting the CSI-RS using the downlink symbols in the slot and receiving the uplink data using the uplink symbols in the slot.

Some examples of the method, apparatuses, and non-transitory computer-readable medium described herein may further include operations, features, means, or instructions for identifying a downlink control channel corresponding to a first portion of the slot and multiplexing the CSI-RS into the first portion of the slot using one of FDM, CDM, or TDM.

Some examples of the method, apparatuses, and non-transitory computer-readable medium described herein may further include operations, features, means, or instructions for determining that the communication configuration for the CSI-RS corresponds to a delay of the CSI-RS by a first backoff period and transmitting the CSI-RS in a second slot corresponding to the first backoff period from the slot.

Some examples of the method, apparatuses, and non-transitory computer-readable medium described herein may further include operations, features, means, or instructions for determining that a reporting delay from the CSI-RS trigger does not exceed the second slot by at least a threshold number of slots, determining a second backoff period including the first backoff period or a reporting delay, configuring the UE with the second backoff period via at least one downlink control signal, where the at least one downlink control signal includes a DCI, a MAC CE, a RRC message, or a combination thereof and receiving a CSI report in a third slot corresponding to the second backoff period from the slot in which a CSI report was triggered.

DETAILED DESCRIPTION

In some examples of a wireless communications system, a base station may communicate with a user equipment (UE) in a wireless communications system. The base station may transmit to the UE a channel state information reference signal (CSI-RS) trigger, which may indicate to the UE that the base station will transmit CSI-RS after a timing delay. Additionally, the base station may transmit an uplink grant, which may indicate resources for the UE to transmit uplink data. The uplink data transmission may be associated with a time delay between the grant and the uplink data transmission. In some examples, the time delays corresponding to the CSI-RS transmission and the uplink data transmission may be configured such that the CSI-RS and the uplink data transmission collide within a single slot.

In some examples, based on the CSI-RS trigger and uplink grant, the UE and the base station may identify a pending collision for a slot of a time division duplexed (TDD) carrier between a CSI-RS corresponding to the CSI-RS trigger, and uplink data corresponding to the uplink grant. The UE and the base station may determine a communication configuration for the CSI-RS and the uplink data such that no collision occurs. The determined communication configuration for the CSI-RS may include delaying one of the colliding signals, transmitting only one of the colliding signals and suppressing the other, or reconfiguring the slot such that both signals can be transmitted successfully. Additionally, the UE and the base station may determine a CSI reporting configuration based on the determined communication configuration.

Aspects of the disclosure are initially described in the context of a wireless communications system. Aspects of the disclosure are further illustrated by and described with reference to wireless communications timing configurations and process flows. Aspects of the disclosure are further illustrated by and described with reference to apparatus diagrams, system diagrams, and flowcharts that relate to collision handling mechanisms for dynamic TDD systems.

Figure 1:
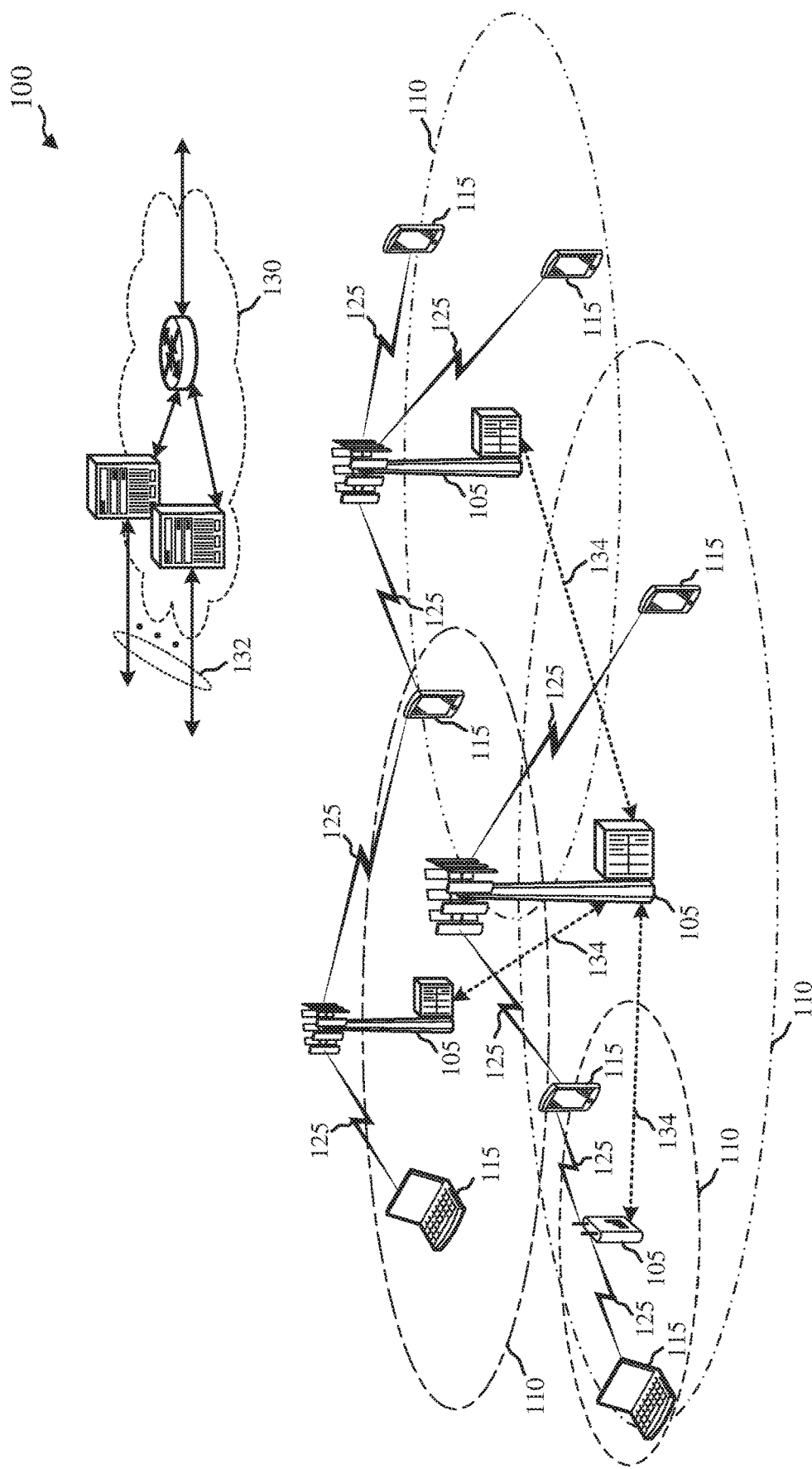
FIG. 1 illustrates an example of a system for wireless communication that supports collision handling mechanisms for dynamic time division duplexed (TDD) systems in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support collision handling mechanisms for dynamic TDD systems in accordance with aspects of the present disclosure. For example, Base station 105 may transmit an uplink grant and a CSI-RS trigger. UE 115 may receive the downlink signals conveying the uplink grant and CSI-RS trigger and identify a pending collision on a slot of a carrier (e.g., a TDD carrier) between a CSI-RS corresponding to the CSI-RS trigger, and the uplink data corresponding to an uplink grant. The UE 115 and the base station 105 may determine a communication configuration for the CSI-RS and the uplink data based on the pending collision. The communication configuration may include suppressing one of the colliding signals, and transmitting the other. In some examples, the communication configuration may include delaying one of the colliding signals. In still other examples, the communication configuration may include reconfiguring the slot such that both of the colliding signals can be transmitted successfully.

Additionally, base station 105 and UE 115 may determine a CSI reporting configuration based on the communication configuration. For example, if one of the colliding signals was delayed, the CSI report may be delayed, or if the CSI-RS was suppressed, then the UE may refrain from transmitting a CSI report. In some examples, a CSI report may be based on previous aperiodic CSI-RS, or on previous or subsequent instances of periodic CSI-RS or semi-persistent CSI-RS.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI or slot may be shorter than a subframe or may be dynamically selected (e.g., in short TTI bursts or in selected component carriers using short TTIs). For example, a slot may correspond to a TTI and may be a configurable number of symbol periods in length.

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), TDD or a combination of both.

In some examples, a base station 105 may gather channel condition information from a UE 115 in order to efficiently configure and schedule the channel. This information may be sent from the UE 115 in the form of a channel state report. A channel state report may contain an RI requesting a number of layers to be used for downlink (DL) transmissions (e.g., based on the antenna ports of the UE 115), a PMI indicating a preference for which precoder matrix should be used (based on the number of layers), and a channel quality information (CQI) representing the highest modulation coding scheme (MCS) that may be used. CQI may be calculated by a UE 115 after receiving predetermined pilot symbols such as cell specific reference signal (CRS) or CSI-RS. RI and PMI may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105.

Figure 2:
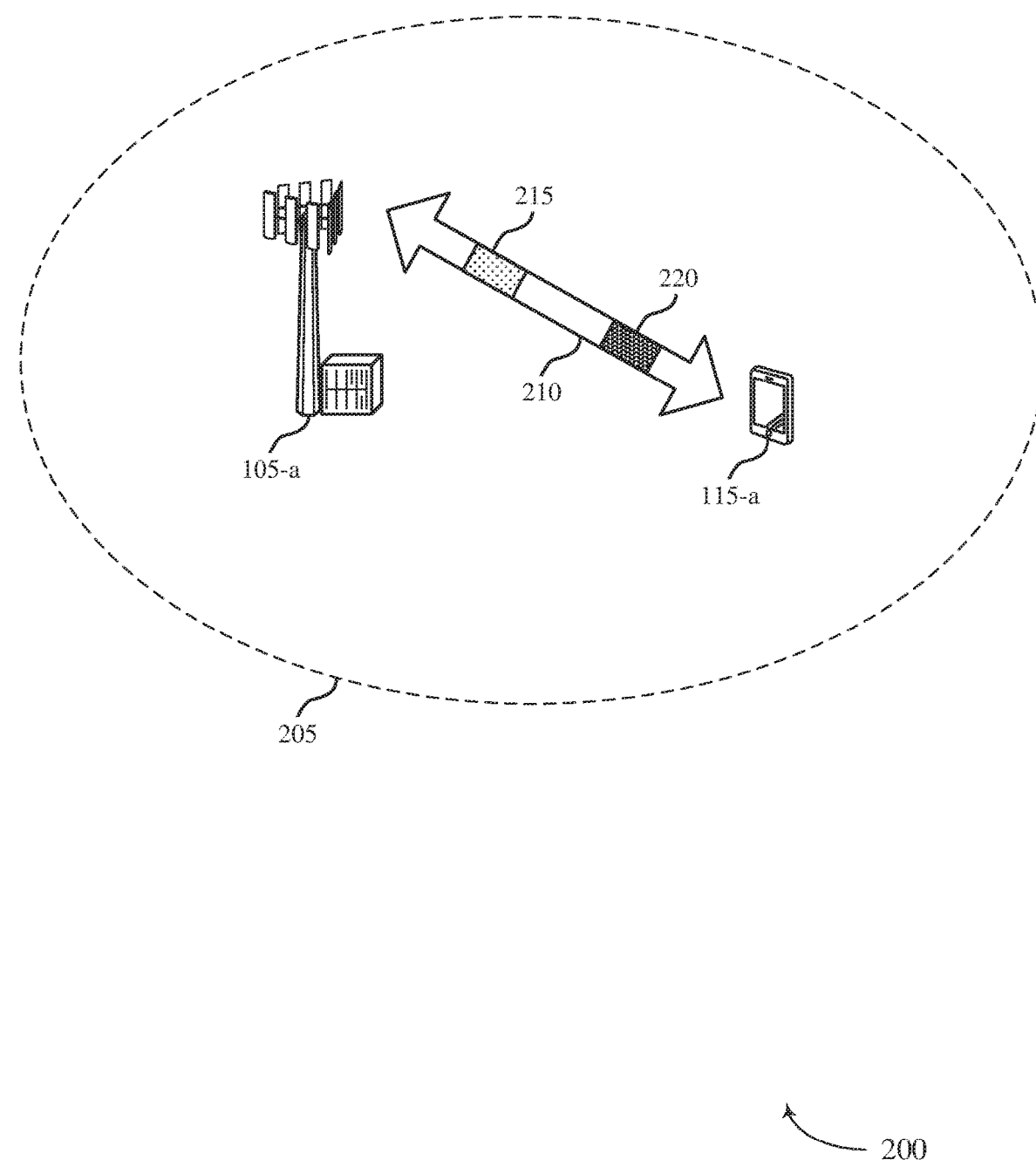
FIG. 2 illustrates an example of a wireless communications system that supports collision handling mechanisms for dynamic TDD systems in accordance with aspects of the present disclosure.

FIG. 2 illustrates an example of a wireless communications system 200 that supports collision handling mechanisms for dynamic TDD systems in accordance with various aspects of the present disclosure. In some examples, wireless communications system 200 may implement aspects of wireless communications system 100. Wireless communications system 200 may include a base station 105-*a* and a UE 115-*a*, which may be examples of the corresponding devices described with reference to FIG. 1.

In some examples, base station 105-*a* may be in communication with one or more UEs 115 within geographic coverage area 205. For example, base station 105-*a* may be in communication with UE 115-*a* via bidirectional communication link 210. Base station 105-*a* may transmit a CSI-RS trigger. The CSI-RS trigger may be an aperiodic CSI-RS trigger, which may be associated with a time delay after which base station 105-*a* may transmit CSI-RS 215. In some examples, the CSI-RS trigger may correspond to semi-persistent CSI-RS or periodic CSI-RS, in which case CSI-RS 215 may occur repeatedly, at a particular periodicity. Additionally, base station 105-*a* may transmit an uplink grant to UE 115-*a*. The uplink grant may be associated with a time delay after which UE 115-*a* may transmit uplink data 220. In some instances, the triggering events and timing delays may be such that the transmission of CSI-RS 215 and the transmission of uplink data 220 are scheduled to collide within a single slot.

In such examples, base station 105-*a* and UE 115-*a* may determine a communication configuration to address the collision. In some examples, one of CSI-RS 215 and the uplink data 220 may be overridden. For instance, UE 115-*a* may refrain from transmitting uplink data 220, allowing base station 105-*a* to transmit CSI-RS 215 without collision. Alternatively, base station 105-*a* may refrain from transmitting CSI-RS 215 allowing UE 115-*a* to transmit uplink data 220 without collision. In some examples, a backoff period may be applied to one of CSI-RS 215 or uplink data 220. For instance, base station 105-*a* may transmit CSI-RS 215 within the scheduled slot. In such examples, UE 115-*a* may apply a timing offset to uplink data 220 such that uplink data 220 is delayed by the timing offset after the scheduled slot. Or, UE 115-*a* may transmit uplink data 220 at its scheduled slot. In such examples, base station 105-*a* may apply a timing offset to CSI-RS 215 such that CSI-RS 215 is delayed by the timing offset after the scheduled slot.

In some examples, UE 115-*a* and base station 105-*a* may reconfigure the slot in which the collision is identified such that both CSI-RS 215 and uplink data 220 can be successfully transmitted without colliding. UE 115-*a* may determine the number of symbols configured for uplink transmission, and may perform rate matching based on an amount of total aperiodic, periodic, or semi-persistent resources. In some examples, UE 115-*a* and base station 105-*a* may multiplex CSI-RS 215 into a PDCCH domain of the slot in which uplink data 220 is scheduled.

Upon determining one or more of the above mentioned approaches to the detected collision between CSI-RS 215 and uplink data 220, UE 115-*a* may determine a CSI-RS reporting configuration. For example, if base station 105-*a* suppresses CSI-RS 215, then UE 115-*a* may not transmit a CSI-RS report. Base station 105-*a* may determine that no CSI report will be transmitted, and will not expect to receive any CSI report from UE 115-*a*. In some cases, UE 115-*a* may operate in a carrier aggregation mode. In such examples, UE 115-*a* may determine that a CSI-RS 215 has been suppressed on a first component carrier, but may receive a CSI-RS 215 on one or more additional component carriers. UE 115-*a* may perform measurements on the one or more additional component carriers, and may transmit a CSI report. The CSI report may have a smaller payload because it may not include a CSI measurements corresponding to the first component carrier on which no measurement was performed.

In some examples, UE 115-*a* may determine that base station 105-*a* has suppressed CSI-RS 215. In such examples, UE 115-*a* may refrain from taking measurements corresponding to that CSI-RS 215. Instead, UE 115-*a* may transmit a CSI report containing measurements corresponding to a prior CSI-RS 215. In some examples, UE 115-*a* may operate in a carrier aggregation mode. In such examples, UE 115-*a* may perform measurements on each of the latest CSI-RS signals relative to the slot in which the CSI report is to be transmitted (e.g., a prior CSI-RS). In some examples, CSI-RS 215 may be a periodic CSI-RS or a semi-persistent CSI-RS. In such cases, CSI-RS 215 may be one of multiple CST-RS transmissions (e.g., one of multiple instances of CSI-RS scheduled using a single CSI-RS trigger or configuration message). In some such instances, UE 115-*a* may receive one or more CSI-RS instances, but may not receive all CSI-RS instances. In such cases, UE 115-*a* may perform CSI measurements on the received CSI-RS instances, and refrain of performing measurements on slots where a CSI-RS instance is suppressed. In cases where UE 115-*a* operates in a carrier aggregation mode, UE 115-*a* may transmit a corresponding CSI report based on measurements for previously received CSI-RS instances.

In some examples, UE 115-*a* may determine that CSI-RS 215 has been transmitted after a backoff period, instead of at a regularly scheduled slot. In such cases, UE 115-*a* may determine a second backoff period. For example, the second backoff period may be determined by adding some additional offset to the first backoff period. The CSI-RS may be transmitted after the first backoff period from the slot, and the CSI report may be transmitted after the second backoff period from the transmitted CSI-RS. The second backoff period may be the same or different from the first backoff period.

Figure 3:
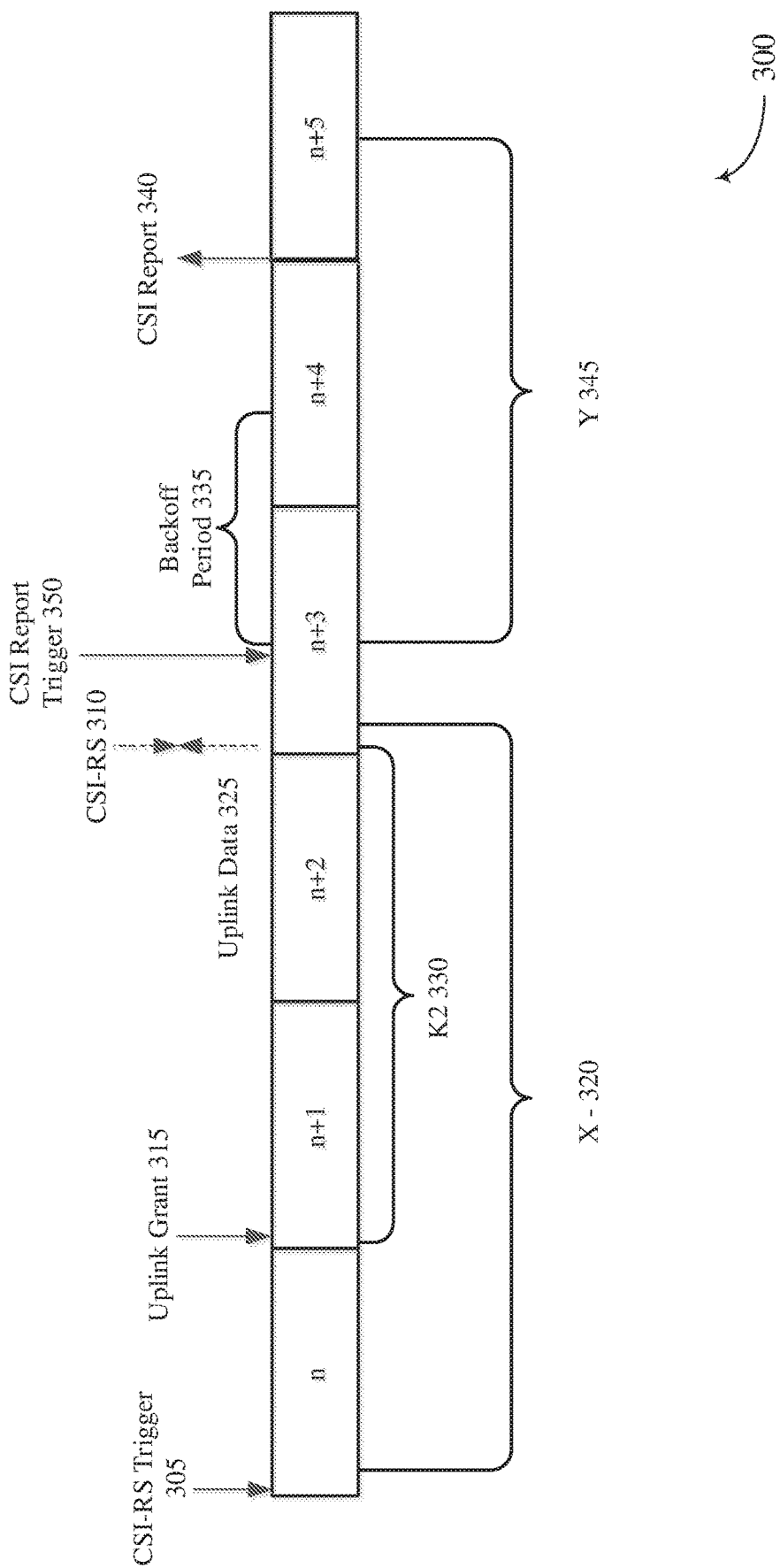
FIG. 3 illustrates an example of a wireless communications timing configuration that supports collision handling mechanisms for dynamic TDD systems in accordance with aspects of the present disclosure.

FIG. 3 illustrates an example of a wireless communications timing configuration 300 that supports collision handling mechanisms for dynamic TDD systems in accordance with various aspects of the present disclosure. In some examples, wireless communications timing configuration 300 may implement aspects of wireless communications system 100 and wireless communications system 200. Wireless communications timing configuration 300 may be implemented by a base station 105-*a* and a UE 115-*a*, which may be examples of the corresponding devices described with reference to FIGS. 1 and 2.

Base station 105-*a* may transmit CSI-RS trigger 305 at a time t1 (e.g., in slot n). In some examples, CSI-RS trigger 305 may configure an aperiodic CSI-RS. CSI-RS trigger 305 may correspond to CSI-RS 310. UE 115-*a* may receive CSI-RS trigger 305 in slot n, and aperiodic CSI-RS 310 may be associated with a timing delay X 320. Timing delay X 320 may be equal to a number of slots (e.g., three slots) following the slot in which CSI-RS trigger 305 is received (e.g., slot n). Alternatively, timing delay X 320 may be equal to a certain amount of time (e.g., a number of symbol periods or microseconds, etc.) independent from a number of slots. If UE 115-a receives CSI-RS trigger 305 in slot n, and timing delay X 315 is equal to three (3) slots, then UE 115-a may determine that base station 105-a may transmit CSI-RS 310 at slot n+3. Timing delay X 320 may be configured by a downlink control signal (e.g., CSI-RS trigger 305, or a higher layer signal such as an RRC signal or a MAC CE).

In the example of FIG. 3, base station 105-a transmits an uplink grant 315 during slot n+1. Uplink grant 315 may indicate resources on which UE 115-a may transmit uplink data 325. UE 115-a may transmit uplink data 325 corresponding to the uplink grant 315 in a slot after a timing delay K2 330. Timing delay K2 330 may be equal to a number of slots (e.g., two slots) following the slot in which uplink grant 315 is received (e.g., slot n+1). In some cases, timing delay K2 330 may be equal to an amount of time (e.g., a number of symbol periods or microseconds, etc.) independent from a number of slots. Thus, if UE 115-a receives uplink grant 315 in slot n+1, and timing delay K2 330 is equal to one slot, then UE 115-a may transmit uplink data 325 at slot n+3. Timing delay K2 330 may be configured by a downlink control signal (e.g., uplink grant 320 or a higher layer signal such as an RRC signal or a MAC CE).

In some examples, UE 115-a may perform measurements corresponding to CSI-RS 310, and may transmit a CSI report 340 associated with the measurements. UE 115-a may determine a timing delay Y 345 between receiving CSI report trigger 350 and transmitting CSI report 340. Timing delay Y 345 may be equal to a number of slots (e.g., two slots) and may be configured by a downlink control signal (e.g., CSI-RS trigger 305, or a higher layer signal such as an RRC signal or a MAC CE). In some cases, timing delay Y 345 may be equal to an amount of time (e.g., a number of symbol periods or microseconds, etc.) independent from a number of slots. In some examples, UE 115-a may receive a separate downlink control signal, which may include a CSI report trigger which initiates CSI report 340. Thus, if UE 115-a receives CSI report trigger 350 in slot n+3 and Y 345 is equal to two slots, then UE 115-a may transmit CSI report 340 in slot n+5.

As described above, uplink data 325 and CSI-RS 310 may collide in a single slot (e.g., slot n+3). Base station 105-a and UE 115-a may determine that the collision will occur and determine a communication configuration to address the collision. For example, UE 115-a may suppress the transmission of uplink data 325, allowing UE 115-a to receive CSI-RS 310 without collision. Base station 105-a may be aware of the suppression of uplink data 325, and may transmit CSI-RS 310. Additionally, base station 105-a may determine that, based on the suppression of uplink data 325, it will not receive or decode any uplink data corresponding to uplink grant 320 during slot n+3. Base station 105-a may transmit a signal indicating that the uplink data was not successfully communicated (e.g., a negative acknowledgement (NACK) signal) to UE 115-a requesting retransmission of uplink data 325. In some examples, base station 105-a may suppress the transmission of CSI-RS 310, allowing UE 115-a to transmit uplink data 325 without collision during slot n+3. In such examples, UE 115-a may determine the suppression of CSI-RS 310, and may not expect to receive CSI-RS 310.

In some examples, UE 115-a and base station 105-a may dynamically determine whether to suppress either CSI-RS 310 or uplink data 325. In some examples, UE 115-a and base station 105-a may select which transmission to suppress based on which transmission was configured later. For example, if CSI-RS trigger 305 is received at UE 115-a first (e.g., during slot n) and uplink grant 320 is received at UE 115-a later (e.g., during slot n+1), then base station 105-a may suppress CSI-RS 310. Alternatively, if CSI-RS trigger 305 were received later than uplink grant 320, UE 115-a may suppress uplink data 325. In some examples, the rules may be predefined such that both UE 115-a and base station 105-a are aware of them. Alternatively, base station 105-a may determine which transmission to suppress and may indicate to UE 115-a which transmission is to be suppressed. For example, base station 105-a may transmit an indicator (e.g., in CSI-RS trigger 305, uplink grant 320, or a separate downlink control information (DCI) transmission) which includes one or two bits indicating which transmission is to be suppressed.

In some examples, a transmission backoff may be applied to one of CSI-RS 310 or uplink data 325. That is, one of the transmission may be backed off and the other permitted to be transmitted without collision. In some examples, UE 115-a may determine backoff period 335 and apply it to uplink data 325. Backoff period 335 may be equal to a number of slots (e.g., at least one slot), or a set amount of time (e.g., a number of symbol periods or microseconds, etc.) independent from a number of slots. Applying backoff period 335 to uplink data 325 may allow base station 105-a to transmit CSI-RS 310 during slot n+3 without colliding with uplink data 325, and may allow UE 115-a to transmit uplink data 325 at a later time (e.g., after backoff period 335 during slot n+4). Alternatively, base station 105-a may determine backoff period 335 and apply it to CSI-RS 310. In such examples, UE 115-a may transmit uplink data 325 during slot n+3 and base station 105-b may transmit CSI-RS 310 after backoff period 335 during a later slot (e.g., slot n+4).

In some examples, UE 115-a and base station 105-a may dynamically determine whether to apply a backoff period 335 to either CSI-RS 310 or uplink data 325. In some examples, UE 115-a and base station 105-a may select which transmission to apply the backoff period 335 based on which transmission was configured later. For example, if CSI-RS trigger 305 is received at UE 115-a first (e.g., during slot n) and uplink grant 320 is received at UE 115-a later (e.g., during slot n+1), then base station 105-a may apply a backoff period 335 to CSI-RS 310. Alternatively, if CSI-RS trigger 305 were received later than uplink grant 320, UE 115-a may apply a backoff period 335 to uplink data 325. In some examples, the rules may be predefined such that both UE 115-a and base station 105-a are aware of them. Alternatively, base station 105-a may determine to apply backoff period 335 to one of the transmissions, and may indicate the determination to UE 115-a. For example, base station 105-a may transmit a DCI which includes one or two bits indicating to which transmission backoff period 335 will be applied.

Backoff period 335 may be predetermined and known to base station 105-a and UE 115-a. Alternatively, base station 105-a or another network entity may configure backoff period 335. In some examples, base station 105-a may configure a set of backoff periods 335, and may transmit the set via an RRC signal or a MAC CE to UE 115-a. In such examples, base station 105-a may transmit to UE 115-a an indication of which backoff period 335 is to be selected from the set. For example, the indication may be included in a DCI associated with CSI-RS trigger 305, or in a DCI associated with uplink grant 320, or by a DCI that is not associated with either CSI-RS trigger 305 or uplink grant 320. In some examples, UE 115-a may determine the backoff period 335 from the set of backoff period 335 by identifying a field in one of the above mentioned DCIs.

In some examples, UE 115-*a* and base station 105-*a* may reconfigure a slot in which a collision is set to occur (e.g., slot n+3) such that both CSI-RS 310 and uplink data 325 can be successfully communicated. For example, UE 115-*a* or base station 105-*a* may determine a number of symbols used for uplink transmission, and may perform rate matching based on an amount of total CSI-RS resources. For example, in a configuration including 32 ports, the slot n+3 may be configured with three symbols corresponding to PDCCH, four symbols for CSI-RS 310, one symbol for a gap period, and the remaining six symbols may be reserved for PUSCH, SRS, PUCCH, and uplink DMRS. The configuration may be indicated by a downlink control signal (e.g., DCI). The downlink signal containing an indication of the configuration may be determined based on which signal is received later. For instance, if aperiodic CSI-RS trigger 305 is received by UE 115-*a* prior to the reception of uplink grant 320, then the indication of the slot configuration may be included in a DCI corresponding to uplink grant 320. Similarly, if CSI-RS 310 may be semi-persistently scheduled and configured prior to uplink grant 320, then the indication of the slot configuration may be included in a DCI corresponding to uplink grant 320. Alternatively, if uplink grant 320 is received by UE 115-*a* prior to the reception of semi-persistent CSI-RS trigger 305, then the indication of the slot configuration may be included in a DCI corresponding to semi-persistent CSI-RS trigger 305. In some cases, base station 105-*a* may transmit a DCI or other downlink control signal including an indication of the slot configuration that does not correspond to either uplink grant 320 or CSI-RS trigger 305. Such an unaffiliated DCI or downlink control signal may be transmitted without determining which of CSI-RS trigger 305 and uplink grant 320 was received first by UE 115-*a*.

In some examples CSI-RS 310 may be multiplexed into a first portion of a slot in which a collision is set to occur (e.g., slot n+3). For instance, CSI-RS 310 may be multiplexed with a PDCCH portion of slot n+3, using frequency division multiplexing FDM, TDM, or code division multiplexing (CDM). In some cases, the resource configuration for multiplexing CSI-RS 310 may be received in a downlink control signal (e.g., DCI). For instance, if CSI-RS trigger 305 is received by UE 115-*a* prior to the reception of uplink grant 320, then a PDCCH configuration may be included in a DCI corresponding to uplink grant 320. Alternatively, if uplink grant 320 is received by UE 115-*a* prior to the reception of CSI-RS trigger 305, then the PDCCH configuration may be included in a DCI corresponding to CSI-RS trigger 305. In some cases, base station 105-*a* may transmit a DCI or other downlink control signal including the PDCCH configuration that does not correspond to either uplink grant 320 or CSI-RS trigger 305. Such an unaffiliated DCI or downlink control signal may be transmitted without determining which of CSI-RS trigger 305 an uplink grant 320 was received first by UE 115-*a*.

Figure 4:
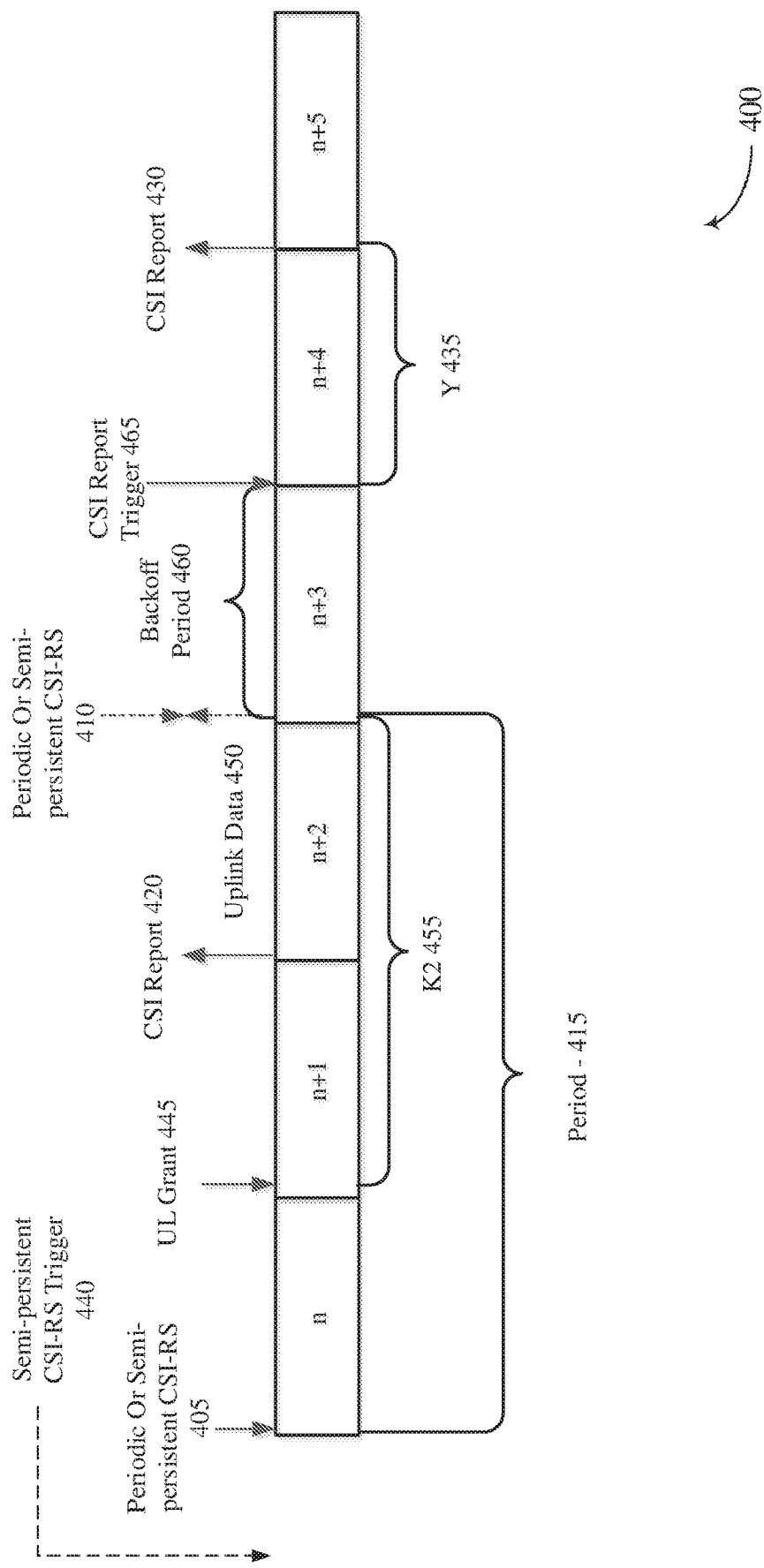
FIG. 4 illustrates an example of a wireless communications timing configuration that supports collision handling mechanisms for dynamic TDD systems in accordance with aspects of the present disclosure.

FIG. 4 illustrates an example of a wireless communications timing configuration 400 that supports collision handling mechanisms for dynamic TDD systems in accordance with various aspects of the present disclosure. In some examples, wireless communications timing configuration 400 may implement aspects of wireless communications system 100. Wireless communications timing configuration 400 may involve aspects of techniques described with reference to FIGS. 1-3, and may be implemented by a base station 105-*a* and a UE 115-*a*, which may be examples of the corresponding devices described with reference to FIGS. 1-3.

In some examples, base station 105-*a* and UE 115-*a* may be configured to utilize periodic CSI-RS. In such cases, base station 105-*a* may transmit CSI-RS at regular intervals. For example, base station 105-*a* may transmit CSI-RS 405 during a slot (e.g. slot n) and may transmit CSI-RS 410 at another slot (e.g., slot n+3) after a period (e.g., period 415). Period 415 may be equal to a number of slots (e.g., 3 slots) or a set amount of time independent from a number of slots. CSI-RS 405 may be a first instance of periodic CSI-RS and CSI-RS 410 may be a second instance of periodic CSI-RS. Periodic CSI-RS may be initiated by a trigger received in a downlink control signal (e.g., a higher layer signal such as an RRC signal or a MAC CE) and may automatically be transmitted at each period 415 until disabled.

In some examples, base station 105-*a* and UE 115-*a* may be configured to utilize semi-persistent CSI-RS. In such cases, base station 105-*a* may transmit CSI-RS at regular intervals. However, base station 105-*a* may, for example, turn the periodic CSI-RS transmissions on and off more frequently than periodic CSI-RS. Similarly to periodic CSI-RS, base station 105-*a* may transmit CSI-RS 405 in slot n, and after a period 415 (e.g., 3 slots) may then transmit CSI-RS 410 in slot n+3. In a semi-persistent CSI-RS configuration, base station 105-*a* may transmit semi-persistent CSI-RS trigger 440 in a previous slot. A first instance of CSI-RS 405 after the CSI-RS trigger 440 may occur a time delay X after CSI-RS trigger 440, and subsequent instances of CSI-RS 410 may occur periodically according to time period 415, until a subsequent semi-persistent CSI-RS trigger or an indicator turning semi-persistent CSI-RS transmissions off.

In some examples, UE 115-*a* may perform measurements corresponding to periodic or aperiodic CSI-RS 405, 410, and may transmit a CSI report 430 associated with the measurements. CSI report 430 may be configured to occur periodically, and the periodicity for CSI report 430 may be different from the CSI-RS period 415. Alternatively, CSI report 430 may be configured to occur subsequent to CSI-RS transmissions 405, 410. For example, UE 115-*a* may determine a timing delay Y 435 between receiving CSI report trigger 465 and transmitting CSI report 430. Timing delay Y 435 may be equal to a number of slots (e.g., at least one slot) and may be configured via a downlink control signal (e.g., CSI-RS trigger 440 or a higher layer signal such as an RRC signal or a MAC CE). In some cases, timing delay Y 435 may be equal to an amount of time (e.g., a number of symbol periods or microseconds, etc.) independent from a number of slots. Alternatively, UE 115-*a* may receive a separate downlink control signal, which may include a CSI report trigger which initiates CSI report 430. Thus, if UE 115-*a* receives CSI report trigger 465 in slot n+4 and Y 435 is equal to one slot, then UE 115-*a* may transmit CSI report 430 in slot n+5.

In some examples, base station 105-*a* may transmit an uplink grant 445 during a slot (e.g., slot n+1). Uplink grant 445 may indicate resources on which UE 115-*a* may transmit uplink data 450. UE 115-*a* may transmit uplink data 450 after a timing delay K2 455. Timing delay K2 455 may be equal to a number of slots (e.g., one or more slots) following the slot in which uplink grant 445 is received (e.g., slot n+1). In some cases, timing delay K2 455 may be equal to an amount of time (e.g., a number of symbol periods or microseconds, etc.) independent from a number of slots. Thus, if UE 115-*a* receives uplink grant 445 in slot n+1, and timing delay K2 455 is equal to two slots, then UE 115-*a* may transmit uplink data 450 at slot n+3. Timing delay K2

455 may be included in a downlink control signal (e.g., uplink grant 445 or a higher layer signal such as an RRC signal or a MAC CE).

As described above, uplink data 450 and CSI-RS 410 may collide in a single slot (e.g., slot n+3). As described above with respect to FIG. 3, UE 115-*a* may identify the pending collision and may determine a communication configuration to address the collision. For example, UE 115-*a* may suppress the transmission of uplink data 450, allowing UE 115-*a* to receive CSI-RS 410 without collision. Base station 105-*a* may transmit a NACK signal to UE 115-*a* requesting retransmission of uplink data 450. In some examples, base station 105-*a* may suppress the transmission of any colliding instances of periodic or semi-persistent CSI-RS 405, 410, allowing UE 115-*a* to transmit uplink data 450 without collision during slot n+3. In such examples, UE 115-*a* may determine the suppression of CSI-RS 410, and may not expect to receive CSI-RS 410.

In some examples, UE 115-*a* and base station 105-*a* may dynamically determine whether to suppress either CSI-RS 410 or uplink data 450. In some examples, UE 115-*a* and base station 105-*a* may select which transmission to suppress based on which transmission was configured later. For example, if semi-persistent CSI-RS trigger 440 is received at UE 115-*a* prior to uplink grant 445 (e.g., during a slot prior to n+1) and uplink grant 445 is received at UE 115-*a* later (e.g., during slot n+1), then base station 105-*a* may suppress CSI-RS 410. Alternatively, if semi-periodic CSI-RS trigger 440 were received later than uplink grant 420, UE 115-*a* may suppress uplink data 450. In some examples, the rules may be predefined such that both UE 115-*a* and base station 105-*a* are aware of them. Alternatively, base station 105-*a* may determine which transmission to suppress and may indicate to UE 115-*a* which transmission is to be suppressed. For example, base station 105-*a* may transmit an indicator (e.g., in uplink grant 445, CSI-RS trigger 440, or in a separate DCI message) which includes one or two bits indicating which transmission is to be suppressed.

In some examples, a transmission backoff may be applied to one of CSI-RS 410 or uplink data 450. That is, one of the transmissions may be backed off and the other permitted to transmit without collision within the slot (e.g., n+3). In some examples, UE 115-*a* may determine backoff period 460 and apply it to uplink data 450, allowing base station 105-*a* to transmit CSI-RS 310 during slot n+3 without colliding with uplink data 450. Alternatively, base station 105-*a* may determine backoff period 460 and apply it to CSI-RS 410. In such examples, UE 115-*a* may transmit uplink data 450 during slot n+3 and base station 105-*b* may transmit CSI-RS 410 after backoff period 460 during a later slot (e.g. slot n+4).

In some examples, UE 115-*a* and base station 105-*a* may dynamically determine whether to apply a backoff period 460 to either CSI-RS 410 or uplink data 450. In some examples, UE 115-*a* and base station 105-*a* may select which transmission to apply the backoff period 460 based on which transmission was configured later. For example, if semi-persistent CSI-RS trigger 440 is received at UE 115-*a* first (e.g., during slot n) and uplink grant 445 is received at UE 115-*a* later (e.g., during slot n+1), then base station 105-*a* may apply a backoff period 460 to semi-persistent CSI-RS 410. In some examples, base station 105-*a* may apply backoff period 460 to each instance of periodic or semi-persistent CSI-RS following the slot in which a collision occurs. Alternatively, if semi-persistent CSI-RS trigger 440 were received later than uplink grant 445, UE 115-*a* may apply a backoff period 460 to uplink data 450.

In some examples, the rules may be predefined such that both UE 115-*a* and base station 105-*a* are aware of them. Alternatively, base station 105-*a* may determine to apply backoff period 460 to one of the transmissions, and may indicate the determination to UE 115-*a*. For example, base station 105-*a* may transmit an indicator (e.g., in uplink grant 445, CSI-RS trigger 440, or in a separate DCI message) which includes one or two bits indicating to which transmission backoff period 460 will be applied.

Backoff period 460 may be predetermined and known to base station 105-*a* and UE 115-*a*. Alternatively, base station 105-*a* or another network entity may configure backoff period 335. In some examples, base station 105-*a* may configure a set of backoff periods (e.g., via a downlink control signal such as an RRC signal or a MAC CE). In such examples, base station 105-*a* may transmit to UE 115-*a* an indication of which backoff period 460 is to be selected from the set. For example, the indication may be included signaling associated with a semi-persistent or periodic CSI-RS configuration, in a DCI associated with semi-persistent CSI-RS trigger 440, in a DCI associated with uplink grant 450, or by a DCI that is not associated with either semi-persistent CSI-RS trigger 440 or uplink grant 445. In some examples, UE 115-*a* may determine the backoff period 460 from the set of backoff periods 460 by identifying a field in one of the above mentioned DCIs.

In some examples, UE 115-*a* and base station 105-*a* may reconfigure a slot in which a collision is set to occur (e.g., slot n+3) such that both CSI-RS 410 and uplink data 450 can be successfully communicated. For example, UE 115-*a* or base station 105-*a* may determine a number of symbols used for uplink transmission, and may perform rate matching based on an amount of total CSI-RS resources. For example, in a configuration including 32 ports, then the slot n+3 may be configured with three symbols corresponding to PDCCH, four symbols for CSI-RS 410, one symbol for a gap period, and the remaining six symbols may be reserved for PUSCH, SRS, PUCCH, and uplink DMRS. The configuration may be indicated by a downlink control signal (e.g., DCI). The downlink signal containing an indication of the configuration may be determined based on which signal is received later. For instance, if semi-persistent CSI-RS trigger 440 is received by UE 115-*a* prior to the reception of uplink grant 445, then the indication of the slot configuration may be included in a DCI corresponding to uplink grant 445. Alternatively, if uplink grant 445 is received by UE 115-*a* prior to the reception of semi-persistent CSI-RS trigger 440, then the indication of the slot configuration may be included in a DCI corresponding to semi-persistent CSI-RS trigger 440. In some cases, base station 105-*a* may transmit a DCI or other downlink control signal including an indication of the slot configuration that does not correspond to either uplink grant 445 or semi-persistent CSI-RS trigger 440. Such an unaffiliated DCI or downlink control signal may be transmitted without determining which of semi-persistent CSI-RS trigger 440 an uplink grant 450 was received first by UE 115-*a*.

In some examples CSI-RS 410 may be multiplexed into a first portion of a slot in which a collision is set to occur (e.g., slot n+3). For instance, CSI-RS 410 may be multiplexed with a PDCCH portion of slot n+3, using frequency division multiplexing FDM, TDM, or CDM. In some cases, the resource configuration for multiplexing CSI-RS 410 may be received in a downlink control signal (e.g., DCI). For instance, if semi-persistent CSI-RS trigger 440 is received by UE 115-*a* prior to the reception of uplink grant 445, then a PDCCH configuration may be included in a DCI corresponding to uplink grant 445. Alternatively, if uplink grant 445 is received by UE 115-a prior to the reception of semi-persistent CSI-RS trigger 440, then the PDCCH configuration may be included in a DCI corresponding to semi-persistent CSI-RS trigger 440. In some cases, base station 105-a may transmit a DCI or other downlink control signal including the PDCCH configuration that does not correspond to either uplink grant 445 or semi-persistent CSI-RS trigger 440. Such an unaffiliated DCI or downlink control signal may be transmitted without determining which of CSI-RS trigger 445 and uplink grant 440 was received first by UE 115-a.

Figure 5:
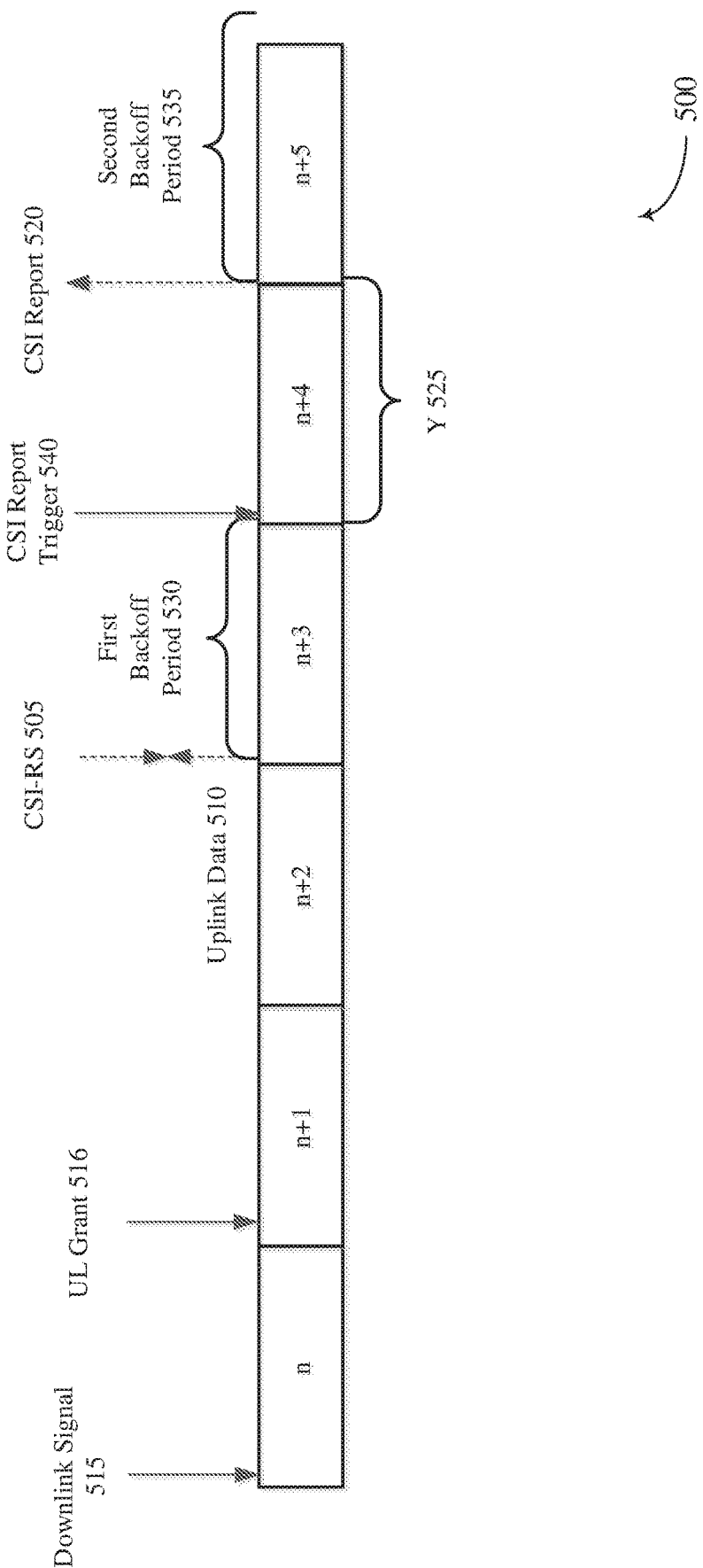
FIG. 5 illustrates an example of a wireless communications timing configuration that supports collision handling mechanisms for dynamic TDD systems in accordance with aspects of the present disclosure.

FIG. 5 illustrates an example of a wireless communications timing configuration 500 that supports collision handling mechanisms for dynamic TDD systems in accordance with various aspects of the present disclosure. In some examples, wireless communications timing configuration 500 may implement aspects of wireless communication system 100. Wireless communications timing configuration 500 may involve aspects of techniques described with reference to FIGS. 1-4, and may be implemented by a base station 105-a and a UE 115-a, which may be examples of the corresponding devices described with reference to FIGS. 1-4.

In some examples, base station 105-a may transmit a downlink signal 515. Downlink signal 515 may be an aperiodic CSI-RS trigger. An aperiodic CSI-RS trigger may initiate the transmission of CSI-RS 505, which may be an aperiodic CSI-RS. Alternatively, downlink signal 515 may be a periodic CSI-RS. Periodic CSI-RS may be transmitted at a given period (e.g., every 3 slots), and thus CSI-RS 505 may be one instance of periodic CSI-RS. In some examples, downlink signal 515 may be a semi-persistent CSI-RS trigger, which may turn on periodic transmissions of CSI-RS such that CSI-RS 505 is received periodically, starting with a particular slot (e.g., slot n+3). In some examples, base station 105-a may transmit an uplink grant 516, indicating resources on which UE 115-a may transmit uplink data 510. Uplink grant 516 may include information regarding a timing after which UE 115-a is to transmit uplink data 510. In some cases, CSI-RS 505 (corresponding to downlink signal 515) and uplink data 510 (corresponding to uplink grant 516) may be configured such that a collision occurs in a given slot (e.g., slot n+3).

In some examples, base station 105-a and UE 115-a may determine a pending collision in a slot (e.g., slot n+3). In such cases, base station 105-a and UE 115-a may determine a communication configuration to address the collision, as discussed in greater detail with reference to FIGS. 3 and 4. Upon receiving a CSI report trigger 540, UE 115-a may determine whether to transmit CSI report 520, and a timing for transmitting CSI report 520. For example, UE 115-a may perform measurements corresponding to CSI-RS 505, and may transmit a CSI report 520 associated with the measurements. UE 115-a may determine a timing delay Y 525 between receiving CSI report trigger 540 and transmitting CSI report 520. Timing delay Y 525 may be equal to a number of slots (e.g., at least one slot) and may be configured by a downlink control signal (e.g., CSI-RS trigger 515, CSI report trigger 540, or a higher layer signal such as an RRC signal or a MAC CE). In some cases, timing delay Y 525 may be equal to an amount of time (e.g., a number of symbol periods or microseconds, etc.) independent from a number of slots. Thus, if UE 115-a receives CSI report trigger 540 in slot n+4 and Y 525 is equal to one slot, then UE 115-a may transmit CSI report 520 in slot n+5.

In some examples, CSI-RS 505 may be aperiodic, and base station 105-a may suppress CSI-RS 505. In some examples, CSI-RS 505 may be periodic or semi-persistent CSI-RS, and base station 105-a may suppress one or more instances of CSI-RS 505 that are scheduled to collide with uplink data 510. In such cases, UE 115-a may refrain from transmitting CSI-RS report 520. Additionally, base station 105-a may refrain from detecting a CSI-RS report in the previously scheduled timing (e.g., slot n+5). Alternatively, if base station 105-a suppresses CSI-RS 505, then UE 115-a may perform CSI measurements on a CSI-RS configuration that excludes CSI-RS 505. For instance, UE 115-a may determine the closest instances of CSI-RS. If downlink signal 515 corresponds to an aperiodic CSI-RS transmission, UE 115-a may determine whether the aperiodic CSI-RS transmission has similar characteristics (e.g., ports, bands, etc.), and may transmit CSI report 520 based on the measurements conducted at the prior instance of CSI-RS. In such examples, base station 105-a may receive CSI report 520 relative to the current reference slot.

In some examples, CSI-RS 505 may be semi-persistent CSI-RS or periodic CSI-RS, and one or more instances may be suppressed or ignored. However, UE 115-a may receive one or more other instances of the periodic or semi-persistent CSI-RS 505. In such examples, UE 115-a may have performed CSI measurements corresponding to previously received instances within a current periodic or semi-persistent CSI-RS configuration. For instance, downlink signal 515 may be a first instance of a currently configured CSI-RS configuration. UE 115-a may determine that CSI-RS 505 has been suppressed to avoid a collision with uplink data 510, but may perform CSI measurements corresponding to periodic or semi-persistent CSI-RS instances received in downlink signal 515, and may transmit CSI report 520 in slot n+5 as scheduled. Or, in some examples, a periodic or semi-persistent CSI-RS configuration may include six instances of CSI-RS (not shown), and instances four and five may collide with uplink data 510. In such examples, UE 115-a may ignore (e.g., not perform measurements for) CSI-RS instances four and five, but may perform CSI measurements corresponding to instances one, two, three, and six. In such cases, the payload for CSI-RS report 520 may remain unchanged, and base station 105-a may expect, receive, and decode CST report 520 at the scheduled timing (e.g., slot n+5).

In some examples, as discussed with reference to FIGS. 3 and 4, an aperiodic, periodic, or semi-persistent CSI-RS 505 may be delayed by a first backoff period 530. In such examples, UE 115-a may delay CSI report 520 by applying a second backoff period 535. Second backoff period 535 may be based at least in part on first backoff period 530, and may additionally be based on some additional timing offset. Second backoff period 530 and/or the additional timing offset may be a predetermined value known to both UE 115-a and base station 105-a. Alternatively, base station 105-a may configure second backoff period 530 and/or the additional timing offset. In some examples, base station 105-a may indicate a set of second backoff periods 535 to UE 115-a via a MAC CE or RRC signaling. Base station 105-a may select one of the set and may indicate the selected backoff period 535 to UE 115-a via a downlink control signal such as the DCI corresponding to CSI report trigger 540, the DCI corresponding to a CSI-RS trigger, the DCI associated with uplink grant 516, or a DCI that is not associated with either CSI report trigger 540, a CSI-RS trigger, or uplink grant 516. In some examples, the application of the second timing offset 535 to CS1 report 520 may offset CSI report 520 by the second timing offset from slot n+5 (e.g., to slot n+6 where the second timing offset 535 is equal to one slot). Additionally, in some examples, subsequent CSI-RS transmissions and CSI reports may also be delayed by first timing offset 530 and second timing offset 535, respectively.

Figure 6:
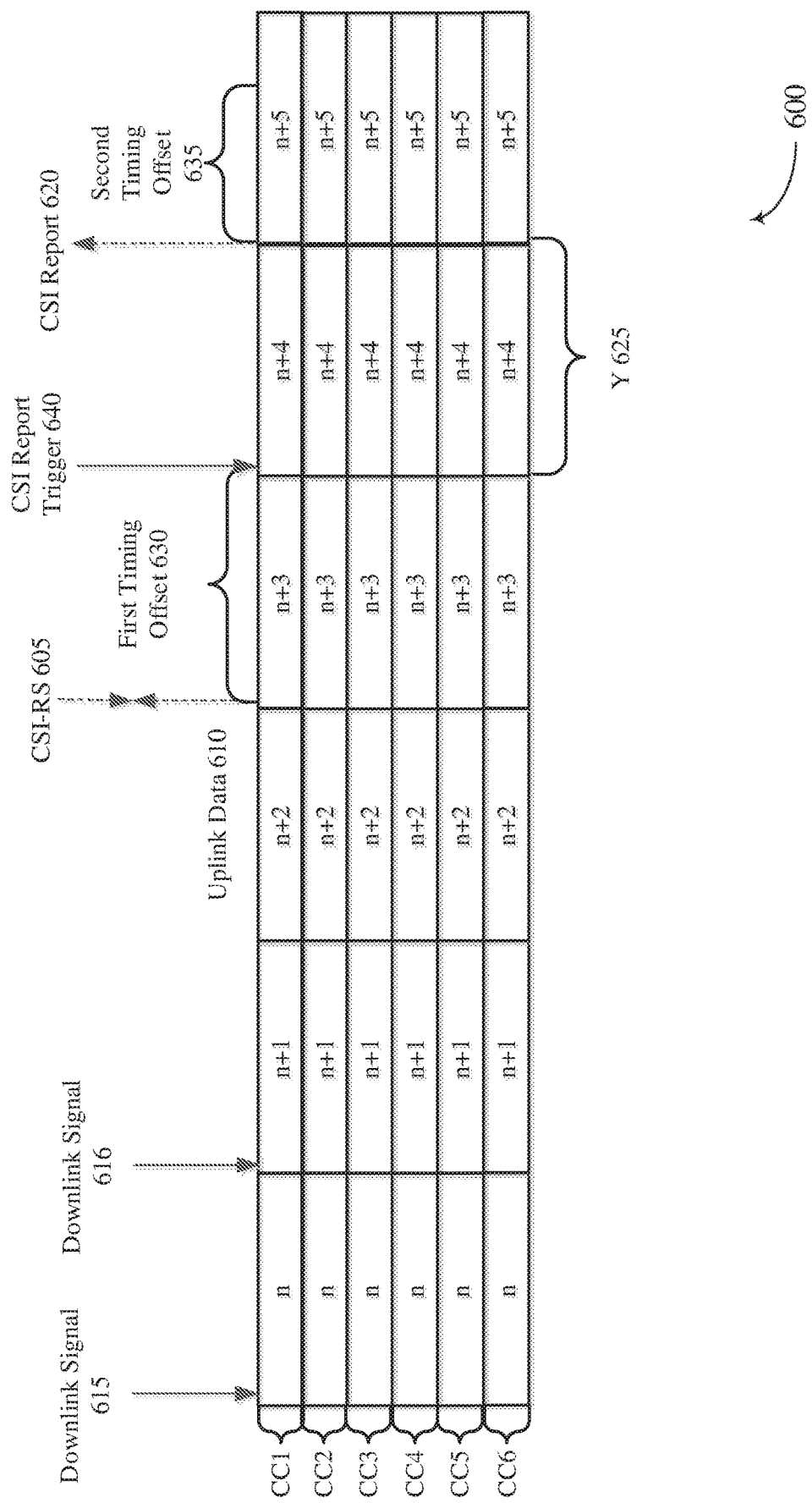
FIG. 6 illustrates an example of a wireless communications timing configuration that supports collision handling mechanisms for dynamic TDD systems in accordance with aspects of the present disclosure.

FIG. 6 illustrates an example of a wireless communications timing configuration 600 that supports collision handling mechanisms for dynamic TDD systems in accordance with various aspects of the present disclosure. In some examples, wireless communications timing configuration 600 may implement aspects of wireless communication system 100. Wireless communications timing configuration 600 may involve aspects of techniques described with reference to FIGS. 1-5, and may be implemented by a base station 105-*a* and a UE 115-*a*, which may be examples of the corresponding devices described with reference to FIGS. 1-5. In some examples, Base station 105-*a* and UE 115-*a* may be configured to communicate in a carrier aggregation mode. Thus, base station 105-*a* and UE 115-*a* may communicate via more than one component carrier (CC), such as CC1-CC6.

In some examples, base station 105-*a* may transmit a downlink signal 615. Base station 105-*a* may transmit downlink signal 615 via one or more of CC1-CC6. Downlink signal 615 may be an aperiodic CSI-RS trigger. An aperiodic CSI-RS trigger may initiate the transmission of CSI-RS 605, which may be an aperiodic CSI-RS. Alternatively, downlink signal 615 may be a periodic CSI-RS. Periodic CSI-RS may be transmitted at a given periodicity (e.g., 3 slots), and thus CSI-RS 605 may be another instance of periodic CSI-RS. In some examples, downlink signal 615 may be a semi-persistent CSI-RS trigger, which may turn on periodic transmissions of CSI-RS such that CSI-RS 605 is received after a given period, in a particular slot (e.g., slot n+3). In some examples, base station 105-*a* may transmit an uplink grant 616, indicating resources on which UE 115-*a* may transmit uplink data 610. Uplink grant 616 may include information regarding a timing after which UE 115-*a* is to transmit uplink data 610. In some cases, CSI-RS 605 (corresponding to downlink signal 615) and uplink data 610 (corresponding to uplink grant 616) may be configured such that a collision occurs in a given slot (e.g., slot n+3).

In some examples, base station 105-*a* and UE 115-*a* may determine a pending collision in a slot (e.g., slot n+3). In such cases, base station 105-*a* and UE 115-*a* may determine a communication configuration to address the collision, as discussed in greater detail with reference to FIGS. 3-5. In such examples, UE 115-*a* may determine whether to transmit CSI report 620, and a timing for transmitting CSI report 620. For example, UE 115-*a* may perform measurements corresponding to CSI-RS 605, and may transmit a CSI report 620 associated with the measurements. UE 115-*a* may determine a timing delay Y 625 between receiving CSI report trigger 640 and transmitting CSI report 620. Timing delay Y 625 may be equal to a number of slots (e.g., one slot) and may be configured by a downlink control signal. In some cases, timing delay timing delay Y 625 may be equal to an amount of time independent from a number of slots. Alternatively, UE 115-*a* may receive a separate downlink control signal, which may include a CSI report trigger which initiates CSI report 620. Thus, if UE 115-*a* receives CSI report trigger 640 in slot n+4 and Y 625 is equal to one slot, then UE 115-*a* may transmit CSI report 620 in slot n+5.

In some examples, CSI-RS 605 may be aperiodic, and base station 105-*a* may suppress CSI-RS 605. In some examples, CSI-RS 505 may be periodic or semi-persistent CSI-RS, and base station 105-*a* may suppress one or more instances of CSI-RS 505 that are scheduled to collide with uplink data 510. If CSI-RS 605 is aperiodic, UE 115-*a* may ignore CSI-RS 605 on a first group of CCs (e.g., CC1), and perform CSI measurements and transmit a CSI report 620 on a second group of CCs (e.g., CC2). UE 115-*a* may ignore one or more instances of semi-persistent CSI-RS 605 on a third group of CCs (e.g., CC3) and may perform CSI measurements and transmit a CSI report 620 on a fourth group of CCs (e.g. CC4). UE 115-*a* may ignore one or more instances of periodic CSI-RS 605 on a fifth group of CCs, (e.g., CC5) and may perform CSI measurements and transmit a CSI report 620 on a sixth group of CCs (e.g. CC6). Thus, UE 115-*a* may make no CSI measurements and transmit no CSI report 620 for CC1, CC3, and CC5, and may perform CSI measurements and transmit CSI report 620 for CC2, CC4, and CC6. In such examples, the payload of CSI report 620 may be decreased according to the number of CCs on which CSI measurements were received, and base station 105-*a* may expect, receive, and decode CSI report 620 according to the reduced payload size. In some examples, UE 115-*a* may perform CSI measurements and transmit CSI report 620 on CC1, CC3, and CC5 corresponding to a most recent CSI-RS configuration relative to a current slot (e.g., slot n+3). In such cases, base station 105-*a* may detect CSI report 620 according to the most recent CSI-RS configuration relative to slot n+3.

In some examples, CSI-RS 605 may be one of periodic CSI-RS or semi-persistent CSI-RS. UE 115-*a* may ignore one or more instances of CSI-RS 605 on one or more CCs (or base station 105-*a* may suppress one or more instances of CSI-RS 605) and may receive one or more instances of semi-persistent or aperiodic CSI-RS 605 via one or more CCs. For example, UE 115-*a* may receive CSI-RS 605 on CC2, CC4, and CC6. UE 115-*a* may ignore one or more instances of CSI-RS 605 on CC1, CC3, and CC5. Thus, on CC1, CC3, and CC5, UE 115-*a* may perform CSI measurements and transmit CSI report 620 corresponding to previously received instances within a current CSI-RS configuration.

As discussed with respect to FIG. 5, an aperiodic, periodic, or semi-persistent CSI-RS 605 may be delayed by a first backoff period 630. In such examples, UE 115-*a* may delay CSI report 620 my applying a second backoff period 635. Second backoff period 635 may be based at least in part on first backoff period 630, and may additionally be based on some additional timing offset. Second backoff period 630 and/or the additional timing offset may be a predetermined value known to both UE 115-*a* and base station 105-*a*. Alternatively, base station 105-*a* may configure second backoff period 630 and/or the additional timing offset. In some examples, base station 105-*a* may indicate a set of second backoff periods 635 to UE 115-*a* via a MAC CE or RRC signaling. Base station 105-*a* may select one of the set and may indicate the selected backoff period 635 to UE 115-*a* via a downlink control signal such as the DCI corresponding to a CSI report trigger, the DCI corresponding to a CSI report trigger, the DCI associated with uplink grant 616, or a DCI that is not associated with either a CSI report trigger, a CSI-RS trigger, or uplink grant 616. In such cases, second timing offset 635 may be applied to CC1. Additionally, second timing offset 635 may be applied to CC2-CC6 such that CSI report 620 is delayed by timing offset 635 for all CCs.

In the example timing configurations shown in FIGS. 3-6, the example timing delays X, Y, K2, and backoff periods are given for ease of illustration. It should be understood that these timing delays can be defined in any number of ways (e.g., slots, microseconds, or symbol periods), and can be any duration. Each of these timing delays may be predetermined or configurable via control signaling (e.g., RRC signaling, MAC CE signaling, etc.).

Figure 7:
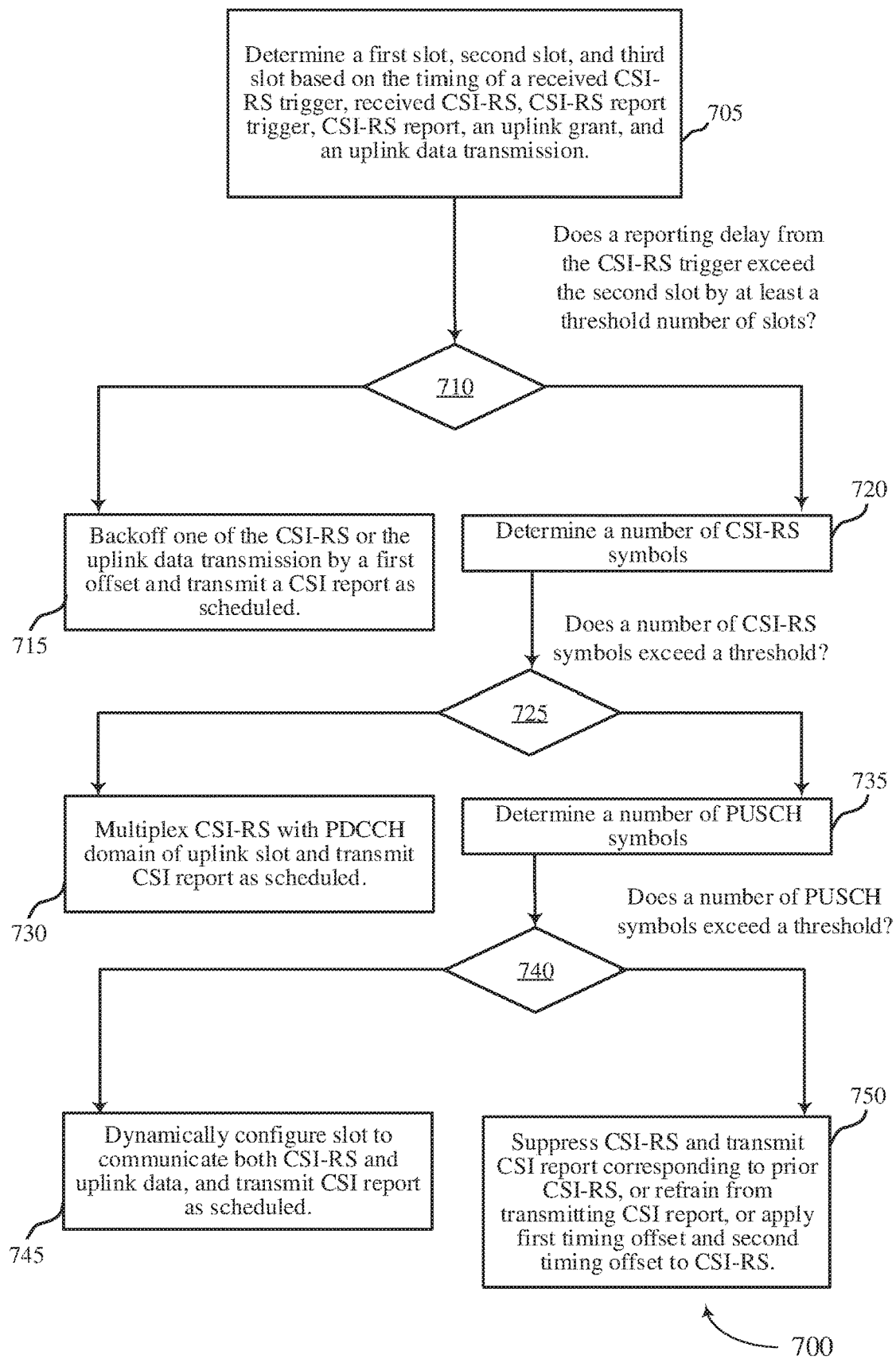
FIG. 7 illustrates an example of a process flow that supports collision handling mechanisms for dynamic TDD systems in accordance with aspects of the present disclosure.

FIG. 7 illustrates an example of a process flow 700 that supports collision handling mechanisms for dynamic TDD systems in accordance with various aspects of the present disclosure. In some examples, process flow 700 may implement aspects of wireless communication system 100. Wireless communications timing configuration 700 may involve aspects of techniques described with reference to FIGS. 1-6, and may be implemented by a base station 105-a and a UE 115-a, which may be examples of the corresponding devices described with reference to FIGS. 1-6.

At 705, a wireless communications device (e.g. UE 115-a and/or base station 105-a) may determine a configured timing for receiving a CSI-RS and transmitting a CSI report. That is, the wireless communications device may determine a first slot (in which a CSI-RS is triggered), a second slot, (in which CSI-RS is received) and a third slot (in which a CSI-RS is to be transmitted). The wireless communications device may further determine a CSI-RS resource configuration (e.g., a number of CSI-RS symbols) and a traffic load of colliding uplink data and CSI-RS (e.g., a number of PUSCH symbols). At 710, the wireless communications device may determine whether a reporting delay from a CSI-RS trigger exceeds the second slot by at least a threshold number of slots. If the reporting delay exceeds the threshold, then the wireless communications device may determine, even if the CSI-RS is delayed by a first timing offset, that the wireless communications device will have enough time to perform CSI measurements and transmit a CSI report at the scheduled timing. Thus, if the reporting delay exceeds the threshold, at 715, the wireless communications device may backoff one of a CSI-RS or an uplink data transmission by a first timing offset, and may transmit a CSI report as scheduled.

Alternatively, if the reporting delay does not exceed the threshold, at 720 the wireless communications device may determine a number of CSI-RS symbols in the CSI-RS. At 725, the wireless communications device may determine whether the number of CSI-RS symbols exceeds a threshold. If the number of CSI-RS symbols does not exceed a certain threshold, then at 730, the wireless communications device may multiplex CSI-RS with a PDCCH domain of an uplink centric slot in which uplink data is scheduled to collide with the CSI-RS. In such cases, the wireless communications device may transmit or receive a CSI report as scheduled. If the number of CSI-RS symbols exceeds the threshold, then at 735, the wireless communications device may determine a number of PUSCH symbols in the uplink data scheduled for the slot in which a CSI-RS is also scheduled. At 740, the wireless communications device may determine whether the number of PUSCH symbols exceeds a certain threshold. If the number of PUSCH symbols does not exceed the threshold, then the wireless communications device may dynamically configure the slot in which a collision is pending such that both CSI-RS and uplink data can be transmitted without colliding. That is, if the number of PUSCH symbols does not exceed the threshold, then the uplink centric slot may be configured with less PUSCH symbols and the downlink portion of the slot may be reconfigured to carry CSI-RS. In such cases, the wireless communications device may transmit or receive a CSI report as scheduled.

Alternatively, if the number of PUSCH symbols does exceed the threshold, then the wireless communications device may suppress the CSI-RS and transmit or receive a CSI report corresponding to a prior CSI-RS, or refrain from transmitting or receiving a CSI report, or apply a first timing offset to the CSI-RS and apply a second timing offset to the CS report. For example, a monitoring window (e.g., a number of slots prior to and/or after the scheduled slot) may be defined such that a wireless communications device may determine whether a CSI-RS was transmitted or suppressed, and if the CSI-RS was transmitted, whether it was transmitted after a first timing offset or if it was transmitted as scheduled. If a wireless communications device monitors for CSI-RS during the window, then the wireless communications device may determine whether to transmit a CSI report or to transmit the CSI report after a second timing backoff without receiving an additional indication from the network.

Figure 8:
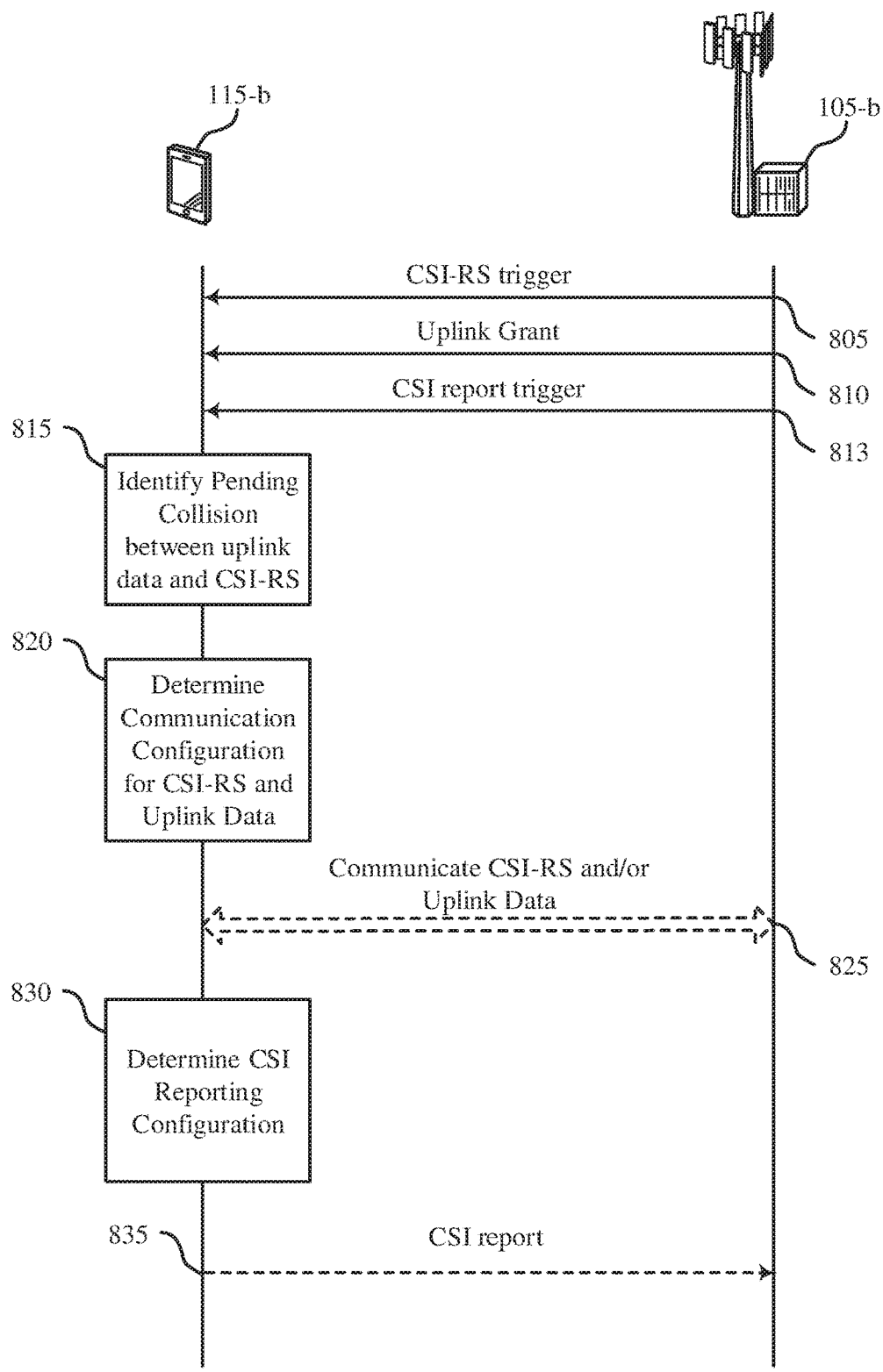
FIG. 8 illustrates an example of a process flow that supports collision handling mechanisms for dynamic TDD systems in accordance with aspects of the present disclosure.

FIG. 8 illustrates an example of a process flow 800 that supports collision handling mechanisms for dynamic TDD systems in accordance with various aspects of the present disclosure. In some examples, process flow 800 may implement aspects of wireless communication system 100. Wireless communications timing configuration 800 may involve aspects of techniques described with reference to FIGS. 1-7, and may be implemented by a base station 105-a and a UE 115-a, which may be examples of the corresponding devices described with reference to FIGS. 1-7.

At 805, base station 115-b may transmit a CSI-RS trigger. At 810, bas station 105-b may transmit an uplink grant. In some cases, UE 115-b may receive a downlink control signal that is separate from the uplink grant or the CSI-RS trigger. The CSI-RS trigger may be configured independently from the uplink grant, or the CSI-RS trigger and the uplink grant may be received in the same slot or a different slot. At 813, base station 105-b may transmit a CSI report trigger to UE 115-b. The CSI report trigger may be configured independently from the CSI-RS trigger communicated at 805 or the uplink grant communicated at 810. Alternatively, the CSI report trigger may be configured and/or received from the CSI-RS trigger communicated at 805 and/or the uplink grant communicated at 810.

At 815, UE 115-b may identify a pending collision between uplink data associated with the uplink grant received at 810, and CSI-RS associated with the CSI-RS trigger received at 805 during a TDD slot.

At 820, UE 115-a may determine a communication configuration for CSI-RS and uplink data. In some cases, a wireless device (UE 115-b and/or base station 105-b) may suppress communication of the uplink data within the slot, communicate the CSI-RS in the slot, and base station 105-b may transmit a NACK indicating that the uplink grant was not communicated and requesting that UE 115-b retransmit the uplink data. In some examples, suppressing communication of the uplink data may be based on determining that the CSI-RS trigger was communicated subsequent to the uplink grant or based on a suppression indication communicated in a downlink control signal.

In some examples, base station 105-b may suppress communication of the CSI-RS for the slot, and may communicate the uplink grant in the slot. In some examples, suppressing communication of the CSI-RS is based on determining that the uplink grant was communicated subsequent to the CSI-RS or based on a suppression indication communicated in a downlink control signal. Additionally, base station 105-b and UE 115-b may monitor for the CSI-RS for a set of slots prior to the slot; and determine whether to report measurements for the CSI-RS based at least in part on the monitoring.

In some examples, UE 115-*b* and/or base station 105-*b* may determine a backoff period comprising one or more slots. Base station 105-*a* may communicate one of the CSI-RS or the uplink data in the slot, and may communicate the other of the CSI-RS or the uplink data in a second slot determined by applying the backoff period from the slot. In some examples, communicating one of the CSI-RS or the uplink data is based on determining which of the CSI-RS and the uplink grant was communicated subsequent to the other, or based on a backoff selection indication communicated in a downlink control signal. Determining the backoff period may include communicating a set of backoff periods via a first downlink control signal, and communicating a second downlink control signal that corresponds to the CSI-RS, the uplink data, or neither the uplink grant or the CSI-RS, and selecting one of the set of backoff periods based at least in part on the communicated second downlink control signal. In some cases, the first downlink control signal and the second downlink control signal may include DCI, a media access control MAC CE, or a RRC message. The backoff selection indication and an index indicating the backoff period from the set of backoff periods may be communicated together in some cases.

In some cases, one or both of base station 105-*b* and UE 115-*b* may determine an amount of CSI-RS resources, and may adapt the communication configuration for communication of the CSI-RS and the uplink data within the slot. Adapting the configuration may include: determining a number of downlink symbols and a number of uplink symbols within the slot for communication of the CSI-RS and the uplink data in the slot, performing rate matching of the uplink data based at least in part on the number of uplink symbols, and communicating the CSI-RS using the downlink symbols and the uplink data using the uplink symbols in the slot.

In some examples, one or both of UE 115-*b* and base station 105-*b* may determine whether the CSI-RS trigger or the uplink grant was communicated later, and communicating the CSI-RS and communicating the uplink data may be based at least in part on the determining. In some examples, communicating the CSI-RS and communicating the uplink data in the slot is based at least in part on receiving a downlink control signal that is separate from the uplink grant or the CSI-RS trigger.

One or both of UE 115-*b* and base station 105-*b* may determine whether to adapt the communication configuration based at least in part on an amount of resources for the uplink data being below a threshold or an amount of frequency resources for the CSI-RS and an amount of frequency resources for the uplink data.

One or both of UE 115-*b* and base station 105-*b* may determine whether to multiplex the CSI-RS into the first portion of the slot based at least in part on an amount of resources for the CSI-RS being less than a threshold or an amount of frequency resources for the CSI-RS and an amount of frequency resources for the uplink data.

In some examples, base station 105-*b* and UE 115-*b* may determine that the CSI-RS is one of periodic CSI-RS or semi-persistent CSI-RS, and may determine a backoff period for the CSI-RS. The device may also offset all subsequent communications of the CSI-RS by the backoff period.

At 825, UE 115-*b* and base station 105-*b* may communicate the CSI-RS and/or the uplink data, according to the determined communication configuration. In some examples, one of the devices may identify a downlink control channel communicated via a first portion of the slot, and multiplex the CSI-RS into the first portion of the slot using one of FDM, CDM, or TDM. base station 105-*b* or UE 115-*b* may determine an order of communication of the CSI-RS trigger and the uplink grant, wherein multiplexing the CSI-RS into the first portion of the slot is based at least in part on the determining. One of base station 105-*b* and UE 115-*b* may determine that the CSI-RS trigger was communicated prior to the uplink grant, and communicate a downlink control signal corresponding to the uplink grant, wherein multiplexing the CSI-RS into the first portion of the slot is based at least in part on the downlink control signal. Alternatively, base station 105-*b* or UE 115-*b* may determine that the uplink grant was communicated prior to the CSI-RS trigger, and may communicate a downlink control signal corresponding to the CSI-RS trigger, wherein multiplexing the CSI-RS into the first portion of the slot is based at least in part on the downlink control signal.

At 830, UE 115-*b* may determine a reporting configuration. UE 115-*b* may receive a report trigger, which may be received in one of a downlink control signal corresponding to the CSI-RS trigger, a downlink control signal corresponding to the uplink grant, or a downlink control signal that corresponds to neither the CSI-RS trigger nor the downlink control signal. In some examples, UE 115-*a* may refrain from performing measurements corresponding to the CSI-RS for the slot on the TDD carrier. In some examples, one of UE 115-*b* and base station 105-*b* may determine that the TDD carrier is one of a plurality of configured component carriers, and may perform measurements on a CSI-RS received in the slot on at least a second component carrier of the plurality of component carriers. In such examples, UE 115-*b* may communicate a CSI report for the second component carrier based at least in part on the measurements for the CSI-RS received in the slot on second component carrier. In some examples, base station 105-*b* or UE 115-*b* may determine that the communication configuration for the CSI-RS corresponds to a delay of the CSI-RS by a first backoff period, and may perform measurements on the CSI-RS received in a second slot corresponding to the first backoff period from the slot.

In some cases, UE 115-*b* or base station 105-*b* may determine that a reporting delay from the CSI-RS trigger does not exceed the second slot by at least a threshold number of slots. In such cases, the device may further determine a second backoff period comprising the first backoff period or a reporting delay; and may communicate a CSI report in a third slot corresponding to the second backoff period from the slot in which a CSI report was triggered. The second backoff period may be predefined. Alternatively, base station 105-*b* may communicate a set of second backoff periods in a first downlink control signal; and may communicate a second downlink control signal, wherein the second downlink control signal corresponds to one of the uplink grant, the CSI-RS trigger, or a downlink control signal that is separate from the uplink grant and the CSI-RS trigger. One of the devices may then select one of the set of second backoff periods based at least in part on the communicated second downlink signal. In some cases, the first downlink control signal comprises DCI, a MAC CE, or a RRC message.

In some cases, one of base station 105-*b* and UE 115-*b* may determine that a reporting delay from the CSI-RS trigger exceeds the second slot by at least a threshold number of slots, and may communicate a CSI report in a third slot corresponding to the timing delay indicated in a CSI report trigger. In some examples, one of base station 105-*b* and 115-*b* may determine that the TDD carrier is one of a plurality of configured component carriers, may perform measurements on a CSI-RS received in the slot on at least a second component carrier of the plurality of component carriers, and may communicate a CSI report comprising the measurements for the CSI-RS received in the slot on the at least the second component carrier. The CSI-RS trigger may be configured independently from the uplink grant, or the CSI-RS trigger and the uplink grant may be received in the same slot or a different slot.

At 835, UE 115-*b* may, in some examples, transmit a CSI report corresponding to the CSI-RS that may have been received at 825. In some examples, UE 115-*b* or base station 105-*b* may suppress communication of a CSI report associated with the CSI report trigger. IN some examples, UE 115-*a* may communicate a CSI report associated with the CSI report trigger for the TDD carrier based at least in part on measurements of CSI-RS performed prior to the slot. The CSI-RS may include an instance of a semi-persistent or periodically configured CSI-RS, and wherein the communicating the CSI report is based at least in part on determining that at least one other instance of the semi-persistent or periodically configured CSI-RS occurs prior to a reporting slot for the semi-persistent or periodically configured CSI-RS.

Figure 9:
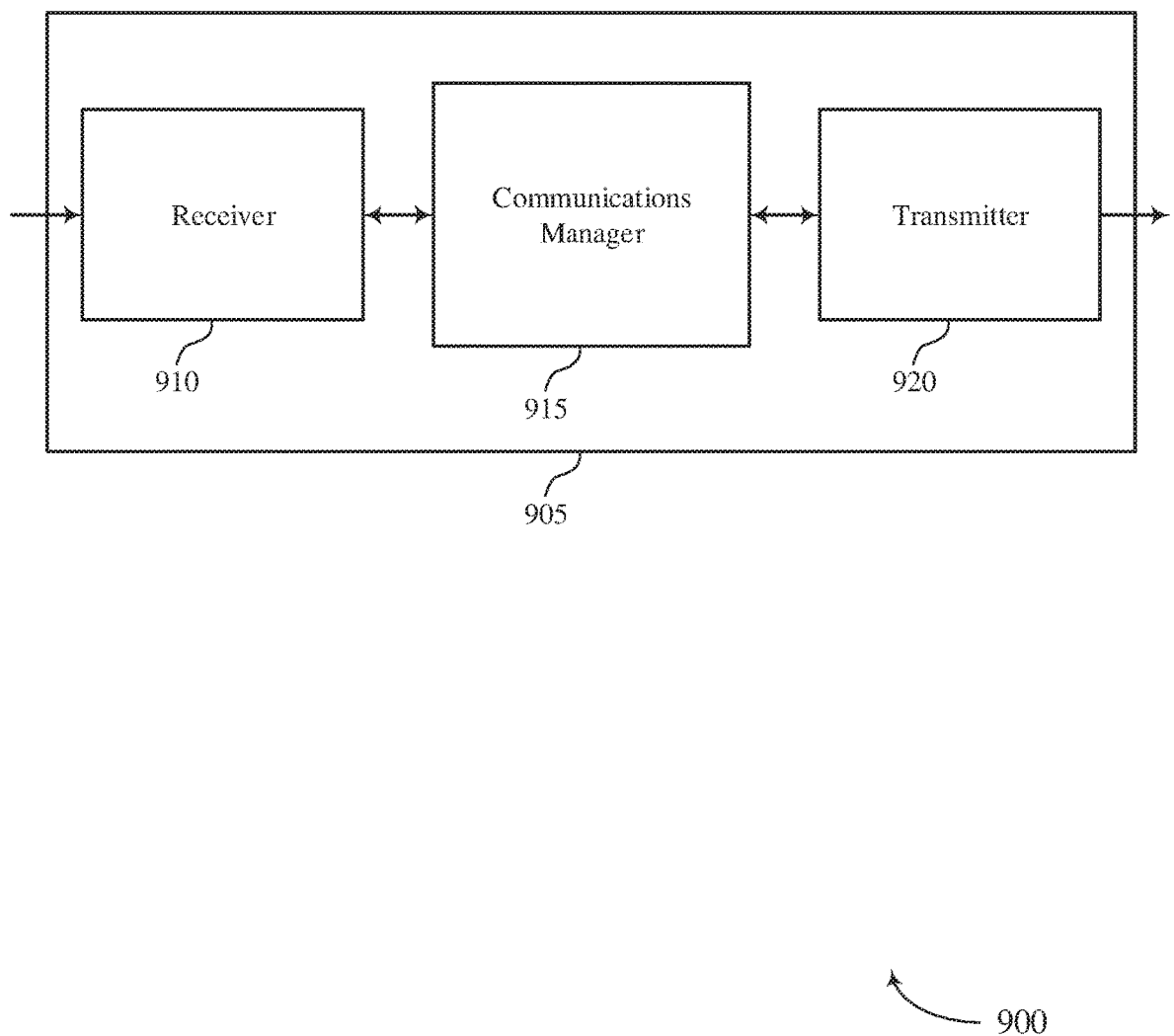
FIGS. 9 through 11 show block diagrams of a device that supports collision handling mechanisms for dynamic TDD systems in accordance with aspects of the present disclosure.

FIG. 9 shows a block diagram 900 of a wireless device 905 that supports collision handling mechanisms for dynamic TDD systems in accordance with aspects of the present disclosure. Wireless device 905 may be an example of aspects of a user equipment (UE) 115 or base station 105 as described herein. Wireless device 905 may include receiver 910, communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to collision handling mechanisms for dynamic TDD systems, etc.). Information may be passed on to other components of the device. The receiver 910 may be an example of aspects of the transceiver 1235 described with reference to FIG. 12. The receiver 910 may utilize a single antenna or a set of antennas. Communications manager 915 may be an example of aspects of the communications manager 1215 described with reference to FIG. 12.

Communications manager 915 and/or at least some of its various sub-components may be implemented in hardware, software executed by a processor, firmware, or any combination thereof. If implemented in software executed by a processor, the functions of the communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 915 and/or at least some of its various sub-components may be physically located at various positions, including being distributed such that portions of functions are implemented at different physical locations by one or more physical devices. In some examples, communications manager 915 and/or at least some of its various sub-components may be a separate and distinct component in accordance with various aspects of the present disclosure. In other examples, communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 915 may identify, for a slot of a TDD carrier, a pending collision between a channel state information reference signal (CSI-RS) corresponding to a CSI-RS trigger and uplink data corresponding to an uplink grant, determine a communication configuration for the CSI-RS and the uplink data based on the pending collision, and determine a CSI reporting configuration based on the communication configuration.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
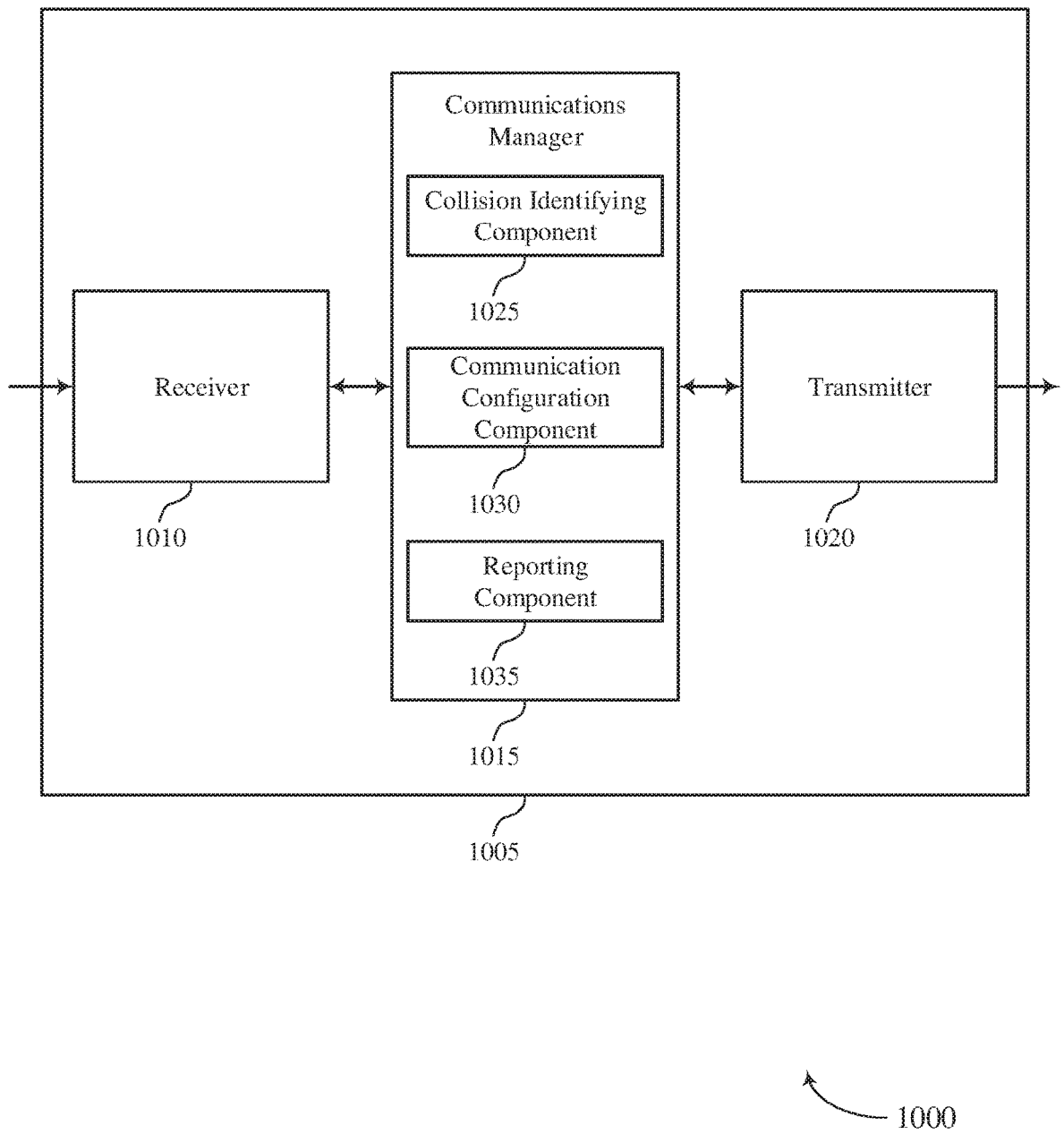

FIG. 10 shows a block diagram 1000 of a wireless device 1005 that supports collision handling mechanisms for dynamic TDD systems in accordance with various aspects of the present disclosure. Wireless device 1005 may be an example of aspects of a wireless device 905 or a UE 115 or base station 105 as described with reference to FIG. 9. Wireless device 1005 may include receiver 1010, communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to collision handling mechanisms for dynamic TDD systems, etc.). Information may be passed on to other components of the device. The receiver 1010 may be an example of aspects of the transceiver 1235 described with reference to FIG. 12. The receiver 1010 may utilize a single antenna or a set of antennas.

Communications manager 1015 may be an example of aspects of the communications manager 1215 described with reference to FIG. 12. Communications manager 1015 may also include collision identifying component 1025, communication configuration component 1030, and reporting component 1035.

Collision identifying component 1025 may identify, for a slot of a TDD carrier, a pending collision between a CSI-RS corresponding to a CSI-RS trigger and uplink data corresponding to an uplink grant.

Communication configuration component 1030 may determine a communication configuration for the CSI-RS and the uplink data based on a pending collision. Communication configuration component 1030 may receive a CSI report trigger, where the CSI report trigger is received in one of a downlink control signal corresponding to the CSI-RS trigger, a downlink control signal corresponding to the uplink grant, or a downlink control signal that corresponds to neither the CSI-RS trigger nor the downlink control signal. Communication configuration component 1030 may communicate a NACK indicating that the uplink grant was not communicated and requesting a retransmission of the uplink data. Communication configuration component 1030 may communicate the uplink grant in the slot, communicate one of the CSI-RS or the uplink data in the slot, communicate the other of the CSI-RS or the uplink data in a second slot determined by applying the backoff period from the slot, and/or determine an amount of CSI-RS resources corresponding to the CSI-RS. Based on the determined amount of CSI-RS resources, communication configuration component 1030 may communicate the CSI-RS using the downlink symbols and the uplink data using the uplink symbols in the slot.

Communication configuration component 1030 may communicate a downlink control signal that is separate from the uplink grant or the CSI-RS trigger, where communicating the CSI-RS and communicating the uplink data in the slot is based on the downlink control signal. Communication configuration component 1030 may determine whether to adapt the communication configuration based on an amount of resources for the uplink data being below a threshold or an amount of frequency resources for the CSI-RS and an amount of frequency resources for the uplink data. Communication configuration component 1030 may identify a downlink control channel communicated via a first portion of the slot, communicate a CSI report associated with the CSI report trigger for the TDD carrier based on measurements of CSI-RS performed prior to the slot, and/or communicate the CSI-RS in the slot. Communication configuration component 1030 may communicate a CSI report for the second component carrier based on the measurements for the CSI-RS received in the slot on second component carrier.

Communication configuration component 1030 may determine that the communication configuration for the CSI-RS corresponds to a delay of the CSI-RS by a first backoff period, determine that a reporting delay from the CSI-RS trigger does not exceed the second slot by at least a threshold number of slots, and/or communicate a CSI report in a third slot corresponding to the second backoff period from the slot in which a CSI report was triggered. Communication configuration component 1030 may communicate a second downlink control signal, where the second downlink control signal corresponds to one of the uplink grant, the CSI-RS trigger, or a downlink control signal that is separate from the uplink grant and the CSI-RS trigger.

In some examples, communication configuration component 1030 may determine that the TDD carrier is one of a set of configured component carriers, determine that the CSI-RS is one of periodic CSI-RS or semi-persistent CSI-RS, and offset all subsequent communications of the CSI-RS by the backoff period. In some cases, the first downlink control signal and the second downlink control signal include DCI, a (MAC control element (CE), or a radio resource control (RRC) message. In some cases, adapting the communication configuration for communication of the CSI-RS and the uplink data within the slot includes determining a number of downlink symbols and a number of uplink symbols within the slot for communication of the CSI-RS and the uplink data in the slot. In some cases, the first downlink control signal includes DCI, a MAC CE, or a RRC message. In some cases, the CSI-RS trigger is configured independently from the uplink grant. In some cases, the CSI-RS trigger and the uplink grant are received in a same slot. In some cases, the CSI-RS trigger and the uplink grant are received in different slots. In some cases, the CSI-RS is one of periodic CSI-RS, aperiodic CSI-RS, or semi-persistent CSI-RS, and the CSI-RS trigger is included in one of a downlink control signal, a MAC CE, or an RRC signal.

Reporting component 1035 may determine a CSI reporting configuration based on the communication configuration, and determine whether to report measurements for the CSI-RS based on monitoring. Reporting component 1035 may determine that a reporting delay from the CSI-RS trigger exceeds a second slot by at least a threshold number of slots, communicate a CSI report in a third slot corresponding to the timing delay indicated in a CSI report trigger, and communicate a CSI report including the measurements for the CSI-RS received in the slot on the at least the second component carrier.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
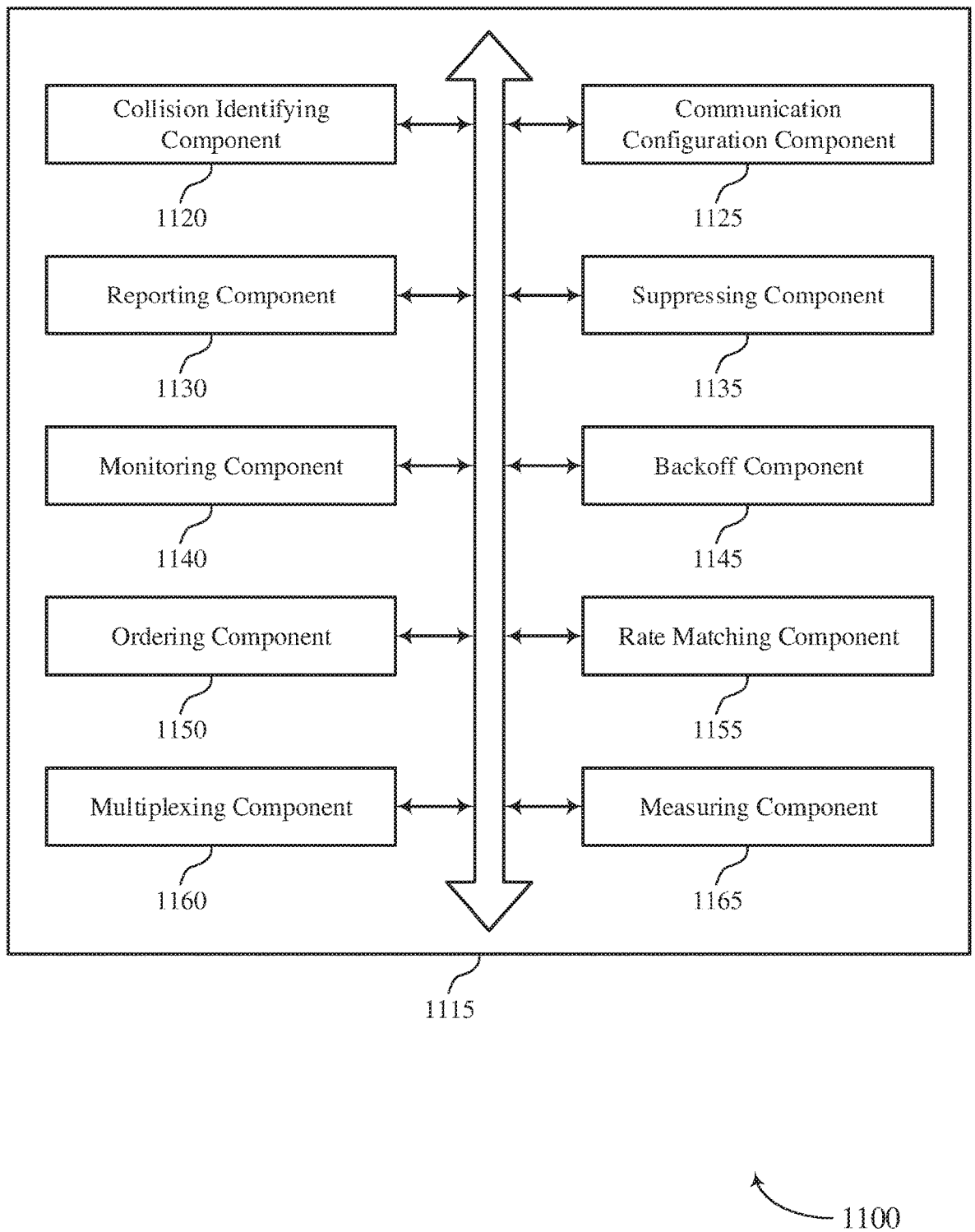

FIG. 11 shows a block diagram 1100 of a communications manager 1115 that supports collision handling mechanisms for dynamic TDD systems in accordance with aspects of the present disclosure. The communications manager 1115 may be an example of aspects of a communications manager 915, a communications manager 1015, or a communications manager 1215 described with reference to FIGS. 9, 10, and 12. The communications manager 1115 may include collision identifying component 1120, communication configuration component 1125, reporting component 1130, suppressing component 1135, monitoring component 1140, backoff component 1145, ordering component 1150, rate matching component 1155, multiplexing component 1160, and measuring component 1165. Each of these modules may communicate, directly or indirectly, with one another (e.g., via one or more buses).

Collision identifying component 1120 may identify, for a slot of a TDD carrier, a pending collision between a CSI-RS corresponding to a CSI-RS trigger and uplink data corresponding to an uplink grant.

Communication configuration component 1125 may determine a communication configuration for the CSI-RS and the uplink data based on the pending collision. Communication configuration component 1125 may communicate a CSI report trigger, where the CSI report trigger is communicated in one of a downlink control signal corresponding to the CSI-RS trigger, a downlink control signal corresponding to the uplink grant, or a downlink control signal that corresponds to neither the CSI-RS trigger nor the downlink control signal. Communication configuration component 1125 may communicate a NACK indicating that the uplink grant was not communicated and requesting a retransmission of the uplink data, or may communicate the uplink grant in the slot. Communication configuration component 1125 may communicate one of the CSI-RS or the uplink data in the slot, and communicate the other of the CSI-RS or the uplink data in a second slot determined by applying a backoff period from the slot.

Communication configuration component 1125 may determine an amount of CSI-RS resources, communicate the CSI-RS using the downlink symbols and the uplink data using the uplink symbols in the slot, and/or communicate a downlink control signal that is separate from the uplink grant or the CSI-RS trigger, where communicating the CSI-RS and communicating the uplink data in the slot is based on the downlink control signal. Communication configuration component 1125 may determine whether to adapt the communication configuration based on an amount of resources for the uplink data being below a threshold or an amount of frequency resources for the CSI-RS and an amount of frequency resources for the uplink data, identify a downlink control channel communicated via a first portion of the slot.

Communication configuration component 1125 may communicate a CSI report associated with the CSI report trigger for the TDD carrier based on measurements of CSI-RS performed prior to the slot, and/or communicate the CSI-RS in the slot. Communication configuration component 1125 may communicate a CSI report for the second component carrier based on the measurements for the CSI-RS received in the slot on a second component carrier. Communication configuration component 1125 may also determine that the communication configuration for the CSI-RS corresponds to a delay of the CSI-RS by a first backoff period.

In some cases, Communication configuration component 1125 may determine that a reporting delay from the CSI-RS trigger does not exceed the second slot by at least a threshold number of slots, and may communicate a CSI report in a third slot corresponding to the second backoff period from the slot in which a CSI report was triggered. Communication configuration component 1125 may communicate a second downlink control signal, where the second downlink control signal corresponds to one of the uplink grant, the CSI-RS trigger, or a downlink control signal that is separate from the uplink grant and the CSI-RS trigger.

Communication configuration component 1125 may determine that the TDD carrier is one of a set of configured component carriers, determine that the CSI-RS is one of periodic CSI-RS or semi-persistent CSI-RS, and offset all subsequent communications of the CSI-RS by the backoff period. In some cases, the first downlink control signal and the second downlink control signal include DCI, a MAC CE, or a RRC message. In some cases, adapting the communication configuration for communication of the CSI-RS and the uplink data within the slot, where adapting the communication configuration includes: determining a number of downlink symbols and a number of uplink symbols within the slot for communication of the CSI-RS and the uplink data in the slot. In some cases, the first downlink control signal includes DCI, a MAC CE, or a RRC message. In some cases, the CSI-RS trigger is configured independently from the uplink grant. In some cases, the CSI-RS trigger and the uplink grant are received in a same slot. In some cases, the CSI-RS trigger and the uplink grant are received in different slots. In some cases, the CSI-RS is one of periodic CSI-RS, aperiodic CSI-RS, or semi-persistent CSI-RS, and the CSI-RS trigger is included in one of a downlink control signal, a MAC CE, or an RRC signal.

Reporting component 1130 may determine a CSI reporting configuration based on the communication configuration, determine whether to report measurements for the CSI-RS based on the monitoring, determine that a reporting delay from the CSI-RS trigger exceeds the second slot by at least a threshold number of slots, communicate a CSI report in a third slot corresponding to the timing delay indicated in a CSI report trigger, and communicate a CSI report including the measurements for the CSI-RS received in the slot on the at least the second component carrier.

Suppressing component 1135 may suppress communication of the uplink data in the slot, suppress communication of the CSI-RS for the slot, and suppress communication of a CSI report associated with the CSI report trigger. In some cases, the suppressing communication of the uplink data is based on determining that the CSI-RS trigger was communicated subsequent to the uplink grant or based on a suppression indication communicated in a downlink control signal. In some cases, the suppressing communication of the CSI-RS is based on determining that the uplink grant was communicated subsequent to the CSI-RS or based on a suppression indication communicated in a downlink control signal.

Monitoring component 1140 may monitor for the CSI-RS for a set of slots prior to the slot. Backoff component 1145 may determine a backoff period including one or more slots, and may communicate a second downlink control signal that corresponds to the CSI-RS, the uplink data, or neither the uplink grant or the CSI-RS. Backoff component 1145 may select one of a set of backoff periods based on the communicated second downlink control signal, and may determine a second backoff period including the first backoff period or a reporting delay, and may select one of the set of second backoff periods based on the communicated second downlink control signal. Backoff component 1145 may determine a backoff period for the CSI-RS. In some cases, determining the backoff period further includes: communicating a set of backoff periods via a first downlink control signal. In some cases, the backoff selection indication and an index indicating the backoff period from the set of backoff periods are communicated together. In some cases, the second backoff period is predefined. In some cases, determining the second backoff period further includes: communicating a set of second backoff periods in a first downlink control signal.

Ordering component 1150 may communicate one of the CSI-RS or the uplink data, based on determining which of the CSI-RS and the uplink grant was communicated subsequent to the other, or based on a backoff selection indication communicated in a downlink control signal. Ordering component 1150 may determine whether the CSI-RS trigger or the uplink grant was communicated later, where communicating the CSI-RS and communicating the uplink data is based on the determining. Ordering component 1150 may determine an order of communication of the CSI-RS trigger and the uplink grant, where multiplexing the CSI-RS into the first portion of the slot is based on the determining. Ordering component 1150 may determine that the CSI-RS trigger was communicated prior to the uplink grant, or determine that the uplink grant was communicated prior to the CSI-RS trigger. In some cases, the CSI-RS includes an instance of a semi-persistent or periodically configured CSI-RS, and where communicating the CSI report is based on determining that at least one other instance of the semi-persistent or periodically configured CSI-RS occurs prior to a reporting slot for the semi-persistent or periodically configured CSI-RS.

Rate matching component 1155 may perform rate matching of the uplink data based on the number of uplink symbols. Multiplexing component 1160 may multiplex the CSI-RS into the first portion of the slot using one of FDM, code division multiplexing CDM, or time-division multiplexing TDM. Multiplexing component 1160 may communicate a downlink control signal corresponding to the uplink grant, where multiplexing the CSI-RS into the first portion of the slot is based on the downlink control signal. Multiplexing component 1160 may communicate a downlink control signal corresponding to the CSI-RS trigger, where multiplexing the CSI-RS into the first portion of the slot is based on the downlink control signal, and/or communicate a downlink control signal that does not correspond to the uplink grant or the CSI-RS trigger, where multiplexing the CSI-RS into the first portion of the slot is based on the downlink control signal. Multiplexing component 1160 may determine whether to multiplex the CSI-RS into the first portion of the slot based on an amount of resources for the CSI-RS being less than a threshold or an amount of frequency resources for the CSI-RS and an amount of frequency resources for the uplink data.

Measuring component 1165 may refrain from performing measurements corresponding to the CSI-RS for the slot on the TDD carrier. In some examples, measuring component 1165 perform measurements on a CSI-RS received in the slot on at least a second component carrier of the set of component carriers, and perform measurements on the CSI-RS received in a second slot corresponding to the first backoff period from the slot.

Figure 12:
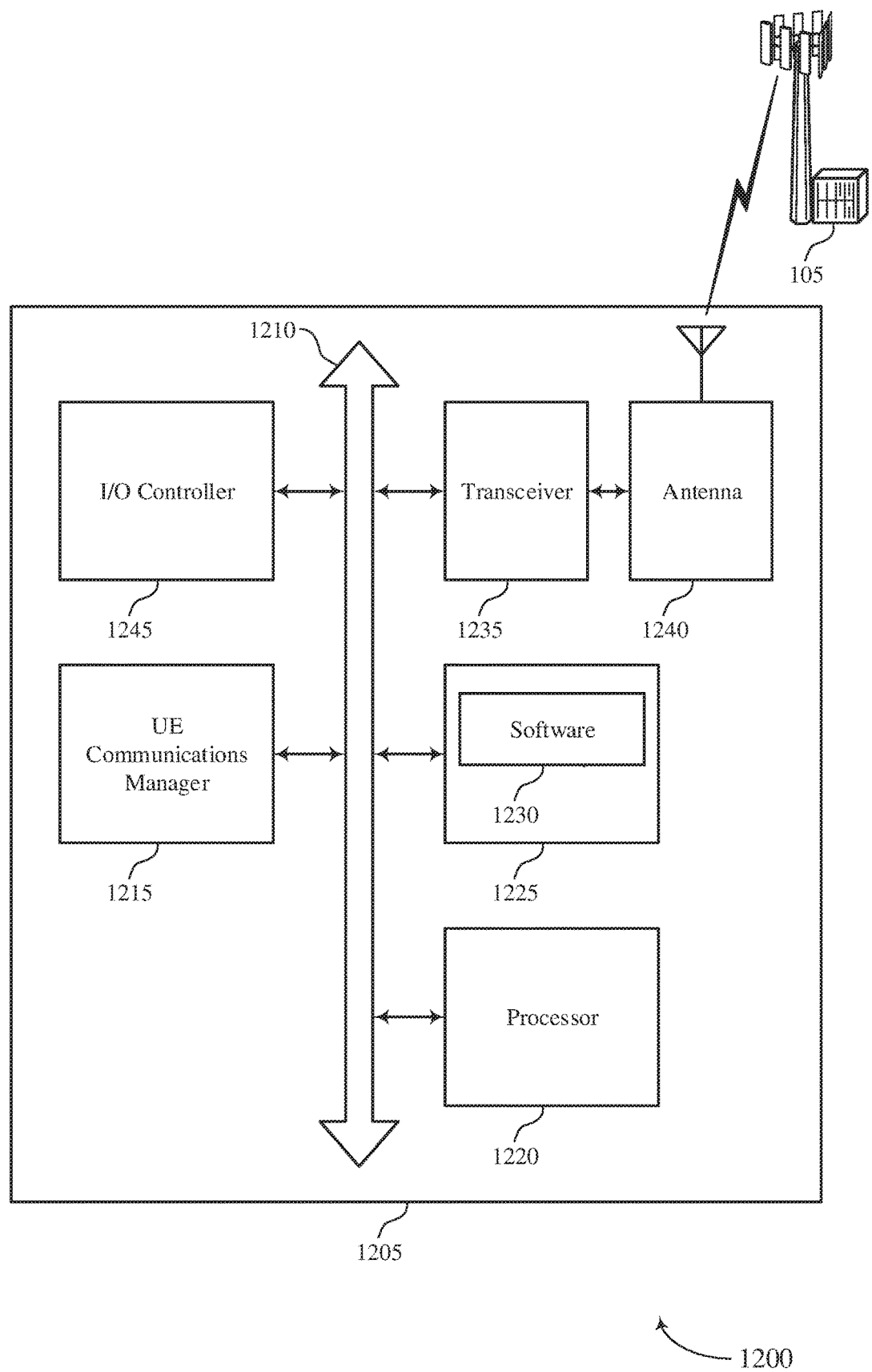
FIG. 12 illustrates a block diagram of a system including a UE that supports collision handling mechanisms for dynamic TDD systems in accordance with aspects of the present disclosure.

FIG. 12 shows a diagram of a system 1200 including a device 1205 that supports collision handling mechanisms for dynamic TDD systems in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting collision handling mechanisms for dynamic TDD systems).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support collision handling mechanisms for dynamic TDD systems. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
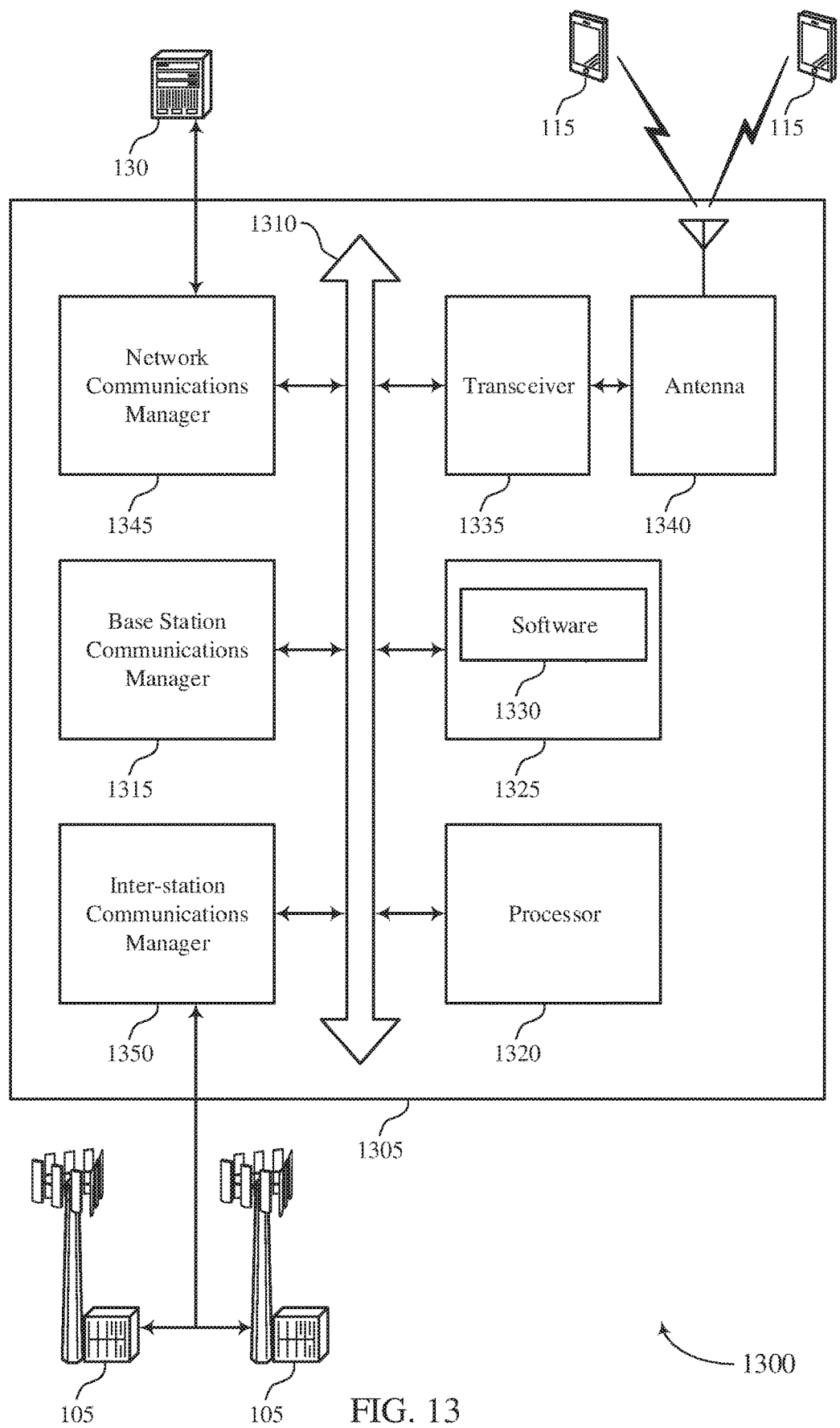
FIG. 13 illustrates a block diagram of a system including a base station that supports collision handling mechanisms for dynamic TDD systems in accordance with aspects of the present disclosure.

FIG. 13 shows a diagram of a system 1300 including a device 1305 that supports collision handling mechanisms for dynamic TDD systems in accordance with aspects of the present disclosure. Device 1305 may be an example of or include the components of wireless device 1005, wireless device 1105, or a base station 105 as described above, e.g., with reference to FIGS. 10 and 11. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting collision handling mechanisms for dynamic TDD systems).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support collision handling mechanisms for dynamic TDD systems. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
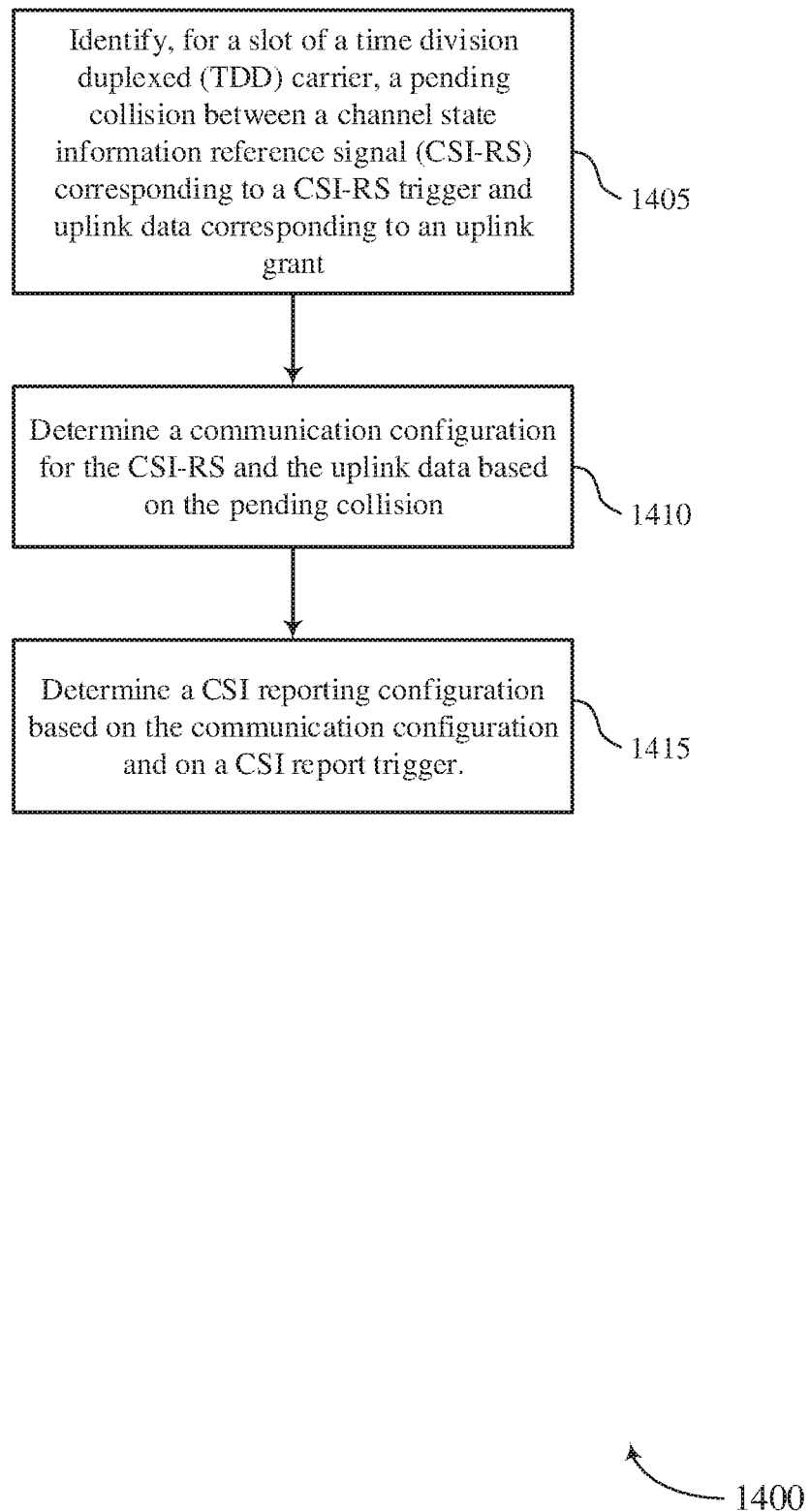
FIG. 14 illustrate methods for collision handling mechanisms for dynamic TDD systems in accordance with aspects of the present disclosure.

FIG. 14 shows a flowchart illustrating a method 1400 for collision handling mechanisms for dynamic TDD systems in accordance with aspects of the present disclosure. The operations of method 1400 may be implemented by a UE 115 or base station 105 or its components as described herein. For example, the operations of method 1400 may be performed by a communications manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1405 the UE 115 or base station 105 may identify, for a slot of a TDD carrier, a pending collision between a CSI-RS corresponding to a CSI-RS trigger and uplink data corresponding to an uplink grant. The operations of block 1405 may be performed according to the methods described herein. In certain examples, aspects of the operations of block 1405 may be performed by a collision identifying component as described with reference to FIGS. 9 through 11.

At block 1410 the UE 115 or base station 105 may determine a communication configuration for the CSI-RS and the uplink data based at least in part on the pending collision. The operations of block 1410 may be performed according to the methods described herein. In certain examples, aspects of the operations of block 1410 may be performed by a communication configuration component as described with reference to FIGS. 9 through 11.

At block 1415 the UE 115 or base station 105 may determine a CSI reporting configuration based at least in part on the communication configuration and a CSI report trigger. The operations of block 1415 may be performed according to the methods described herein. In certain examples, aspects of the operations of block 1415 may be performed by a reporting component as described with reference to FIGS. 9 through 11.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 IX, IX, etc. IS-856 (TIA-856) is commonly referred to as CDMA2000 IxEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a set of backoff periods via a first downlink control signal;
    receiving a channel state information reference signal (CSI-RS) trigger and an uplink grant;
    identifying, for a slot of a carrier, a pending collision between a CSI-RS corresponding to the CSI-RS trigger and uplink data corresponding to the uplink grant;
    receiving a second downlink control signal that corresponds to the CSI-RS, the uplink data, or neither the uplink grant nor the CSI-RS;
    selecting a first backoff period from the set of backoff periods based at least in part on the second downlink control signal, wherein a communication configuration for the CSI-RS and the uplink data corresponds to a delay of the CSI-RS by the first backoff period;
    performing measurements on the CSI-RS received in a second slot corresponding to the first backoff period from the slot;
    identifying a CSI report trigger; and
    determining a CSI reporting configuration based at least in part on the communication configuration associated with the pending collision, the measurements on the CSI-RS, and the CSI report trigger.

2. The method of claim 1, wherein determining the communication configuration for the CSI-RS and the uplink data further comprises:
    transmitting the uplink data in the slot.

3. The method of claim 2, further comprising:
    delaying performing measurements corresponding to the delay of the CSI-RS for the slot on the carrier.

4. The method of claim 2, further comprising:
    delaying transmission of a CSI report associated with the delay of the CSI-RS.

5. The method of claim 1, further comprising:
    determining that a reporting delay from the CSI-RS trigger does not exceed the second slot by at least a threshold number of slots;
    determining a second backoff period comprising the first backoff period or the reporting delay; and
    transmitting a CSI report in a third slot corresponding to the second backoff period from the slot in which the CSI report was triggered.

6. The method of claim 5, wherein determining the second backoff period further comprises:
    receiving a set of second backoff periods in a first downlink control signal;
    the method further comprising:
    receiving a second downlink control signal, wherein the second downlink control signal corresponds to one of the uplink grant, the CSI-RS trigger, or a downlink control signal that is separate from the uplink grant and the CSI-RS trigger; and
    selecting one of the set of second backoff periods based at least in part on the received second downlink control signal.

7. The method of claim 6, wherein at least one of the first downlink control signal and the second downlink control signal comprise downlink control information (DCI), a media access control (MAC) control element (CE), or a radio resource control (RRC) message.

8. The method of claim 1, further comprising:
    determining that a reporting delay from the CSI-RS trigger exceeds the second slot by at least a threshold number of slots; and
    transmitting a CSI report in a third slot corresponding to a timing delay indicated in the CSI report trigger.

9. The method of claim 1, further comprising:
    determining that the carrier is one of a plurality of configured component carriers;
    performing measurements on a CSI-RS received in the slot on at least a second component carrier of the plurality of configured component carriers; and
    transmitting a CSI report comprising the measurements for the CSI-RS received in the slot on at least the second component carrier.

10. An apparatus for wireless communication at a user equipment (UE), comprising:
    means for receiving a set of backoff periods via a first downlink control signal;
    means for receiving a channel state information reference signal (CSI-RS) trigger and an uplink grant;
    means for identifying, for a slot of a carrier, a pending collision between the CSI-RS corresponding to a CSI-RS trigger and uplink data corresponding to the uplink grant;
    means for receiving a second downlink control signal that corresponds to the CSI-RS, the uplink data, or neither the uplink grant nor the CSI-RS;
    means for selecting a first backoff period from the set of backoff periods based at least in part on the second downlink control signal, wherein a communication configuration for the CSI-RS and the uplink data corresponds to a delay of the CSI-RS by the first backoff period;
    means for performing measurements on the CSI-RS received in a second slot corresponding to the first backoff period from the slot;
    means for identifying a CSI report trigger; and
    means for determining a CSI reporting configuration based at least in part on the communication configuration associated with the pending collision, the measurements on the CSI-RS, and the CSI report trigger.

* * * * *